(12) United States Patent
Shoemaker et al.

(10) Patent No.: US 8,106,927 B2
(45) Date of Patent: Jan. 31, 2012

(54) GRAPHICAL USER INTERFACES AND OCCLUSION PREVENTION FOR FISHEYE LENSES WITH LINE SEGMENT FOCI

(75) Inventors: Garth B. D. Shoemaker, Vancouver (CA); Mark H. A. Tigges, Vancouver (CA)

(73) Assignee: Noregin Assets N.V., L.L.C.

( * ) Notice: Subject to any disclaimer, the term of this patent is extended or adjusted under 35 U.S.C. 154(b) by 1801 days.

(21) Appl. No.: 11/138,979

(22) Filed: May 27, 2005

(65) Prior Publication Data

US 2005/0264894 A1  Dec. 1, 2005

Related U.S. Application Data

(60) Provisional application No. 60/574,931, filed on May 28, 2004.

(51) Int. Cl.
*G09G 5/00* (2006.01)

(52) U.S. Cl. ....................................................... 345/665
(58) Field of Classification Search ........... 345/661–665
See application file for complete search history.

(56) References Cited

U.S. PATENT DOCUMENTS

| | | |
|---|---|---|
| 3,201,546 A | 8/1965 | Richardson |
| 3,704,938 A | 12/1972 | Fanselow |
| 3,739,739 A | 6/1973 | Brase |
| 3,762,799 A | 10/1973 | Shapiro |
| 4,581,647 A | 4/1986 | Vye |
| 4,630,110 A | 12/1986 | Cotton et al. |
| 4,688,181 A | 8/1987 | Cottrell et al. |
| 4,757,616 A | 7/1988 | Hills |
| 4,790,028 A | 12/1988 | Ramage |
| 4,800,379 A | 1/1989 | Yeomans |
| 4,885,702 A | 12/1989 | Ohba |
| 4,888,713 A | 12/1989 | Falk |
| 4,970,028 A | 11/1990 | Kenyon et al. |
| 4,985,849 A | 1/1991 | Hideaki |
| 4,992,866 A | 2/1991 | Morgan |
| 5,031,918 A | 7/1991 | Brill |
| 5,048,077 A | 9/1991 | Wells et al. |
| 5,175,808 A | 12/1992 | Sayre |

(Continued)

FOREIGN PATENT DOCUMENTS

CA   2350342   11/2002

(Continued)

OTHER PUBLICATIONS

"Final Office Action", U.S. Appl. No. 11/935,222, (Nov. 24, 2009), 8 pages.

(Continued)

*Primary Examiner* — Aaron M Richer
(74) *Attorney, Agent, or Firm* — McAndrews, Held & Malloy, Ltd.

(57) ABSTRACT

A method for generating a presentation of a region-of-interest in an original image for display on a display screen, comprising: establishing a lens for the region-of-interest, the lens having a magnified focal region for the region-of-interest at least partially surrounded by a shoulder region having diminishing magnification, the focal region having a perimeter defined by a radius r from a line segment; receiving one or more signals to adjust at least one of the radius r and a length len of the line segment to thereby adjust the perimeter; and, applying the lens to the original image to produce the presentation.

61 Claims, 9 Drawing Sheets

U.S. PATENT DOCUMENTS

| | | |
|---|---|---|
| 5,185,599 A | 2/1993 | Doornink et al. |
| 5,185,667 A | 2/1993 | Zimmerman |
| 5,200,818 A | 4/1993 | Neta et al. |
| 5,206,721 A | 4/1993 | Ashida et al. |
| 5,227,771 A | 7/1993 | Kerr et al. |
| 5,250,934 A | 10/1993 | Denber et al. |
| 5,258,837 A | 11/1993 | Gormley |
| 5,269,687 A | 12/1993 | Mott et al. |
| 5,275,019 A | 1/1994 | Pagani |
| 5,309,279 A | 5/1994 | Halstead |
| 5,321,807 A | 6/1994 | Mumford |
| 5,329,310 A | 7/1994 | Liljegren et al. |
| 5,341,466 A | 8/1994 | Perlin et al. |
| 5,369,527 A | 11/1994 | McCracken |
| 5,416,900 A | 5/1995 | Blanchard et al. |
| 5,432,895 A | 7/1995 | Myers |
| 5,451,998 A | 9/1995 | Hamrick |
| 5,459,488 A | 10/1995 | Geiser |
| 5,473,740 A | 12/1995 | Kasson |
| 5,521,634 A | 5/1996 | McGary |
| 5,523,783 A | 6/1996 | Cho |
| 5,528,289 A | 6/1996 | Cortjens et al. |
| 5,539,534 A | 7/1996 | Hino et al. |
| 5,581,670 A | 12/1996 | Bier et al. |
| 5,583,977 A | 12/1996 | Seidl |
| 5,588,098 A | 12/1996 | Chen et al. |
| 5,594,859 A | 1/1997 | Palmer et al. |
| 5,596,690 A | 1/1997 | Stone et al. |
| 5,598,297 A | 1/1997 | Yamanaka et al. |
| 5,610,653 A | 3/1997 | Abecassis |
| 5,613,032 A | 3/1997 | Cruz et al. |
| 5,638,523 A | 6/1997 | Mullet et al. |
| 5,644,758 A | 7/1997 | Patrick |
| 5,651,107 A | 7/1997 | Frank et al. |
| 5,652,851 A | 7/1997 | Stone et al. |
| 5,657,246 A | 8/1997 | Hogan et al. |
| 5,670,984 A | 9/1997 | Robertson et al. |
| 5,680,524 A | 10/1997 | Maples et al. |
| 5,682,489 A | 10/1997 | Harrow et al. |
| 5,689,287 A | 11/1997 | Mackinlay et al. |
| 5,689,628 A | 11/1997 | Robertson |
| 5,721,853 A | 2/1998 | Smith |
| 5,729,673 A | 3/1998 | Cooper et al. |
| 5,731,805 A | 3/1998 | Tognazzini et al. |
| 5,742,272 A | 4/1998 | Kitamura et al. |
| 5,745,166 A | 4/1998 | Rhodes et al. |
| 5,751,289 A | 5/1998 | Myers |
| 5,754,348 A | 5/1998 | Soohoo |
| 5,764,139 A | 6/1998 | Nojima et al. |
| 5,786,814 A | 7/1998 | Moran et al. |
| 5,798,752 A | 8/1998 | Buxton et al. |
| 5,808,670 A | 9/1998 | Oyashiki et al. |
| 5,812,111 A | 9/1998 | Fuji et al. |
| 5,818,455 A | 10/1998 | Stone et al. |
| 5,848,231 A | 12/1998 | Teitelbaum et al. |
| 5,852,440 A | 12/1998 | Grossman et al. |
| 5,872,922 A | 2/1999 | Hogan et al. |
| 5,909,219 A | 6/1999 | Dye |
| 5,923,364 A | 7/1999 | Rhodes et al. |
| 5,926,209 A | 7/1999 | Glatt |
| 5,949,430 A | 9/1999 | Robertson et al. |
| 5,950,216 A | 9/1999 | Amro et al. |
| 5,959,605 A | 9/1999 | Gilblom |
| 5,969,706 A | 10/1999 | Tanimoto et al. |
| 5,973,694 A | 10/1999 | Steele et al. |
| 5,991,877 A | 11/1999 | Luckenbaugh |
| 5,999,879 A | 12/1999 | Yano |
| 6,005,611 A | 12/1999 | Gullichsen et al. |
| 6,037,939 A | 3/2000 | Kashiwagi et al. |
| 6,052,110 A | 4/2000 | Sciammarella et al. |
| 6,057,844 A | 5/2000 | Strauss |
| 6,064,401 A | 5/2000 | Holzman et al. |
| 6,067,372 A | 5/2000 | Gur et al. |
| 6,072,501 A | 6/2000 | Bier |
| 6,073,036 A | 6/2000 | Heikkinen et al. |
| 6,075,531 A | 6/2000 | DeStefano |
| 6,081,277 A | 6/2000 | Kojima |
| 6,084,598 A | 7/2000 | Chekerylla |
| 6,091,771 A | 7/2000 | Seeley et al. |
| 6,108,005 A | 8/2000 | Starks et al. |
| 6,128,024 A | 10/2000 | Carver et al. |
| 6,133,914 A | 10/2000 | Rogers et al. |
| 6,147,709 A | 11/2000 | Martin et al. |
| 6,154,840 A | 11/2000 | Pebly et al. |
| 6,160,553 A | 12/2000 | Robertson et al. |
| 6,184,859 B1 | 2/2001 | Kojima |
| 6,198,484 B1 | 3/2001 | Kameyama |
| 6,201,546 B1 | 3/2001 | Bodor et al. |
| 6,201,548 B1 | 3/2001 | Cariffe et al. |
| 6,204,845 B1 | 3/2001 | Bates et al. |
| 6,204,850 B1 | 3/2001 | Green |
| 6,215,491 B1 | 4/2001 | Gould |
| 6,219,052 B1 | 4/2001 | Gould |
| 6,241,609 B1 | 6/2001 | Rutgers |
| 6,246,411 B1 | 6/2001 | Strauss |
| 6,249,281 B1 | 6/2001 | Chen et al. |
| 6,256,043 B1 | 7/2001 | Aho et al. |
| 6,256,115 B1 | 7/2001 | Adler et al. |
| 6,256,737 B1 | 7/2001 | Bianco et al. |
| 6,266,082 B1 | 7/2001 | Yonezawa et al. |
| 6,271,854 B1 | 8/2001 | Light |
| 6,278,443 B1 | 8/2001 | Amro et al. |
| 6,278,450 B1 | 8/2001 | Arcuri et al. |
| 6,288,702 B1 | 9/2001 | Tachibana et al. |
| 6,304,271 B1 | 10/2001 | Nehme |
| 6,307,612 B1 | 10/2001 | Smith et al. |
| 6,320,599 B1 | 11/2001 | Sciammarella et al. |
| 6,337,709 B1 | 1/2002 | Yamaashi et al. |
| 6,346,938 B1 | 2/2002 | Chan et al. |
| 6,346,962 B1 | 2/2002 | Goodridge |
| 6,359,615 B1 | 3/2002 | Singh |
| 6,381,583 B1 | 4/2002 | Kenney |
| 6,384,849 B1 | 5/2002 | Morcos et al. |
| 6,392,661 B1 | 5/2002 | Tankersley |
| 6,396,648 B1 | 5/2002 | Yamamoto et al. |
| 6,396,962 B1 | 5/2002 | Haffey et al. |
| 6,400,848 B1 | 6/2002 | Gallagher |
| 6,407,747 B1 | 6/2002 | Chui et al. |
| 6,411,274 B2 | 6/2002 | Watanabe et al. |
| 6,416,186 B1 | 7/2002 | Nakamura |
| 6,417,867 B1 | 7/2002 | Hallberg |
| 6,438,576 B1 | 8/2002 | Huang et al. |
| 6,487,497 B2 | 11/2002 | Khavakh et al. |
| 6,491,585 B1 | 12/2002 | Miyamoto et al. |
| 6,504,535 B1 | 1/2003 | Edmark |
| 6,515,663 B1 | 2/2003 | Hung et al. |
| 6,515,678 B1 | 2/2003 | Boger |
| 6,522,341 B1 | 2/2003 | Nagata |
| 6,523,024 B1 | 2/2003 | Yajima et al. |
| 6,542,191 B1 | 4/2003 | Yonezawa |
| 6,552,737 B1 | 4/2003 | Tanaka et al. |
| 6,559,813 B1 | 5/2003 | DeLuca et al. |
| 6,577,311 B1 | 6/2003 | Crosby et al. |
| 6,577,319 B1 | 6/2003 | Kashiwagi et al. |
| 6,584,237 B1 | 6/2003 | Abe |
| 6,590,568 B1 | 7/2003 | Astala et al. |
| 6,590,583 B2 | 7/2003 | Soohoo |
| 6,608,631 B1 | 8/2003 | Milliron |
| 6,612,930 B2 | 9/2003 | Kawagoe et al. |
| 6,631,205 B1 | 10/2003 | Melen et al. |
| 6,633,305 B1 | 10/2003 | Sarfeld |
| 6,690,387 B2 | 2/2004 | Zimmerman et al. |
| 6,704,034 B1 | 3/2004 | Rodriguez et al. |
| 6,720,971 B1 | 4/2004 | Yamamoto et al. |
| 6,721,655 B1 | 4/2004 | Koichiro |
| 6,727,910 B2 | 4/2004 | Tigges |
| 6,731,285 B2 | 5/2004 | Matchen |
| 6,731,315 B1 | 5/2004 | Ma et al. |
| 6,744,430 B1 | 6/2004 | Shimizu |
| 6,747,610 B1 | 6/2004 | Taima et al. |
| 6,747,611 B1 | 6/2004 | Budd et al. |
| 6,760,020 B1 | 7/2004 | Uchiyama et al. |
| 6,768,497 B2 | 7/2004 | Baar et al. |
| 6,798,412 B2 | 9/2004 | Cowperthwaite |
| 6,833,843 B2 | 12/2004 | Mojaver et al. |
| 6,842,175 B1 | 1/2005 | Schmalstieg et al. |
| 6,874,126 B1 | 3/2005 | Lapidous |

| | | |
|---|---|---|
| 6,882,755 B2 | 4/2005 | Silverstein et al. |
| 6,906,643 B2 | 6/2005 | Samadani et al. |
| 6,911,975 B2 | 6/2005 | Iizuka et al. |
| 6,919,921 B1 | 7/2005 | Morota et al. |
| 6,924,822 B2 | 8/2005 | Card et al. |
| 6,938,218 B1 | 8/2005 | Rosen |
| 6,956,590 B1 | 10/2005 | Barton et al. |
| 6,961,071 B2 | 11/2005 | Montagnese et al. |
| 6,975,335 B2 | 12/2005 | Watanabe |
| 6,985,865 B1 | 1/2006 | Packingham et al. |
| 7,038,680 B2 | 5/2006 | Pitkow |
| 7,055,095 B1 | 5/2006 | Anwar |
| 7,071,971 B2 | 7/2006 | Elberbaum |
| 7,084,886 B2 | 8/2006 | Jetha et al. |
| 7,088,364 B2 | 8/2006 | Lantin |
| 7,106,349 B2 | 9/2006 | Baar et al. |
| 7,133,054 B2 | 11/2006 | Aguera y Arcas |
| 7,134,092 B2 | 11/2006 | Fung et al. |
| 7,158,878 B2 | 1/2007 | Rasmussen |
| 7,173,633 B2 | 2/2007 | Tigges |
| 7,173,636 B2 | 2/2007 | Montagnese |
| 7,194,697 B2 | 3/2007 | Sinclair, II et al. |
| 7,197,718 B1 | 3/2007 | Westerman et al. |
| 7,197,719 B2 | 3/2007 | Doyle et al. |
| 7,213,214 B2 | 5/2007 | Baar et al |
| 7,233,942 B2 | 6/2007 | Nye |
| 7,246,109 B1 | 7/2007 | Ramaswamy |
| 7,256,801 B2 | 8/2007 | Baar et al. |
| 7,274,381 B2 | 9/2007 | Mojaver et al. |
| 7,275,219 B2 | 9/2007 | Shoemaker |
| 7,280,105 B2 | 10/2007 | Cowperthwaite |
| 7,283,141 B2 | 10/2007 | Baar et al. |
| 7,310,619 B2 | 12/2007 | Baar et al. |
| 7,312,806 B2 | 12/2007 | Tigges |
| 7,321,824 B1 | 1/2008 | Nesbitt |
| 7,411,610 B2 | 8/2008 | Doyle |
| 7,423,660 B2 | 9/2008 | Ouchi et al. |
| 7,443,396 B2 | 10/2008 | Ilic |
| 7,450,114 B2 | 11/2008 | Anwar |
| 7,472,354 B2 | 12/2008 | Jetha et al. |
| 7,486,302 B2 | 2/2009 | Shoemaker |
| 7,489,321 B2 | 2/2009 | Jetha et al. |
| 7,493,572 B2 | 2/2009 | Card et al. |
| 7,495,678 B2 | 2/2009 | Doyle et al. |
| 7,580,036 B2 | 8/2009 | Montagnese |
| 7,667,699 B2 | 2/2010 | Komar |
| 7,698,653 B2 | 4/2010 | Roman et al. |
| 7,714,859 B2 | 5/2010 | Shoemaker |
| 7,737,976 B2 | 6/2010 | Lantin |
| 7,761,713 B2 | 7/2010 | Baar |
| 7,773,101 B2 | 8/2010 | Shoemaker |
| 2001/0040585 A1 | 11/2001 | Hartford et al. |
| 2001/0040636 A1 | 11/2001 | Kato et al. |
| 2001/0048447 A1 | 12/2001 | Jogo |
| 2001/0055030 A1 | 12/2001 | Han |
| 2002/0033837 A1 | 3/2002 | Munro |
| 2002/0038257 A1 | 3/2002 | Joseph et al. |
| 2002/0044154 A1 | 4/2002 | Baar et al. |
| 2002/0062245 A1 | 5/2002 | Niu et al. |
| 2002/0075280 A1 | 6/2002 | Tigges |
| 2002/0087894 A1 | 7/2002 | Foley et al. |
| 2002/0089520 A1 | 7/2002 | Baar et al. |
| 2002/0093567 A1 | 7/2002 | Cromer et al. |
| 2002/0101396 A1 | 8/2002 | Huston et al. |
| 2002/0122038 A1 | 9/2002 | Cowperthwaite |
| 2002/0135601 A1 | 9/2002 | Watanabe et al. |
| 2002/0143826 A1 | 10/2002 | Day et al. |
| 2002/0171644 A1 | 11/2002 | Reshetov et al. |
| 2002/0180801 A1* | 12/2002 | Doyle et al. ................ 345/802 |
| 2003/0006995 A1 | 1/2003 | Smith et al. |
| 2003/0007006 A1 | 1/2003 | Baar et al. |
| 2003/0048447 A1 | 3/2003 | Harju et al. |
| 2003/0052896 A1 | 3/2003 | Higgins et al. |
| 2003/0052900 A1 | 3/2003 | Card et al. |
| 2003/0061211 A1 | 3/2003 | Shultz et al. |
| 2003/0076363 A1 | 4/2003 | Murphy |
| 2003/0100326 A1 | 5/2003 | Grube et al. |
| 2003/0103063 A1 | 6/2003 | Mojaver et al. |
| 2003/0105795 A1 | 6/2003 | Anderson et al. |
| 2003/0112503 A1 | 6/2003 | Lantin |
| 2003/0118223 A1 | 6/2003 | Rahn et al. |
| 2003/0137525 A1 | 7/2003 | Smith |
| 2003/0151625 A1 | 8/2003 | Shoemaker |
| 2003/0151626 A1 | 8/2003 | Komar et al. |
| 2003/0174146 A1 | 9/2003 | Kenoyer |
| 2003/0179198 A1 | 9/2003 | Uchiyama |
| 2003/0179219 A1 | 9/2003 | Nakano et al. |
| 2003/0179237 A1 | 9/2003 | Nelson et al. |
| 2003/0196114 A1 | 10/2003 | Brew et al. |
| 2003/0210281 A1 | 11/2003 | Ellis et al. |
| 2003/0227556 A1 | 12/2003 | Doyle |
| 2003/0231177 A1 | 12/2003 | Montagnese et al. |
| 2004/0026521 A1 | 2/2004 | Colas et al. |
| 2004/0056869 A1* | 3/2004 | Jetha et al. ................ 345/620 |
| 2004/0056898 A1 | 3/2004 | Jetha et al. |
| 2004/0111332 A1 | 6/2004 | Baar et al. |
| 2004/0125138 A1 | 7/2004 | Jetha et al. |
| 2004/0150664 A1 | 8/2004 | Baudisch |
| 2004/0194014 A1 | 9/2004 | Anwar |
| 2004/0217979 A1 | 11/2004 | Baar et al. |
| 2004/0240709 A1 | 12/2004 | Shoemaker |
| 2004/0257375 A1 | 12/2004 | Cowperthwaite |
| 2004/0257380 A1 | 12/2004 | Herbert et al. |
| 2005/0041046 A1 | 2/2005 | Baar et al. |
| 2005/0134610 A1 | 6/2005 | Doyle et al. |
| 2005/0259118 A1 | 11/2005 | Mojaver et al. |
| 2005/0278378 A1 | 12/2005 | Frank |
| 2005/0285861 A1 | 12/2005 | Fraser |
| 2006/0022955 A1 | 2/2006 | Kennedy |
| 2006/0026521 A1 | 2/2006 | Hotelling et al. |
| 2006/0033762 A1 | 2/2006 | Card et al. |
| 2006/0036629 A1 | 2/2006 | Gray |
| 2006/0059432 A1 | 3/2006 | Bells |
| 2006/0082901 A1 | 4/2006 | Shoemaker |
| 2006/0098028 A1 | 5/2006 | Baar |
| 2006/0139375 A1 | 6/2006 | Rasmussen et al. |
| 2006/0192780 A1 | 8/2006 | Lantin |
| 2006/0214951 A1 | 9/2006 | Baar et al. |
| 2007/0033543 A1 | 2/2007 | Ngari et al. |
| 2007/0064018 A1 | 3/2007 | Shoemaker et al. |
| 2007/0097109 A1 | 5/2007 | Shoemaker et al. |
| 2009/0141044 A1 | 6/2009 | Shoemaker |
| 2009/0147023 A1 | 6/2009 | Jetha et al. |
| 2009/0172587 A1 | 7/2009 | Carlisle |
| 2009/0265656 A1 | 10/2009 | Jetha et al. |
| 2009/0284542 A1 | 11/2009 | Baar |
| 2010/0026718 A1 | 2/2010 | Jetha |
| 2010/0033503 A1 | 2/2010 | Baar |
| 2010/0045702 A1 | 2/2010 | Doyle |
| 2010/0201785 A1 | 8/2010 | Lantin |
| 2010/0208968 A1 | 8/2010 | Shoemaker et al. |
| 2010/0262907 A1 | 10/2010 | Shoemaker et al. |

FOREIGN PATENT DOCUMENTS

| | | |
|---|---|---|
| CA | 2386560 | 11/2003 |
| CA | 2393708 | 1/2004 |
| CA | 2394119 | 1/2004 |
| EP | 0635779 | 1/1995 |
| EP | 0650144 | 4/1995 |
| EP | 0816983 | 7/1998 |
| JP | 4410465 | 2/2010 |

OTHER PUBLICATIONS

"Final Office Action", U.S. Appl. No. 11/541,778, (Dec. 4, 2009), 12 pages.

"Notice of Allowance", U.S. Appl. No. 11/214,886, (Dec. 15, 2009), 16 pages.

"BPAI Decision", U.S. Appl. No. 10/682,298, (Dec. 30, 2009), 14 pages.

"Notice of Allowance", U.S. Appl. No. 11/410,024, (Jan. 4, 2010), 7 pages.

"Final Office Action", U.S. Appl. No. 11/673,038, (Jan. 8, 2010), 33 pages.

"Advisory Action", U.S. Appl. No. 11/541,778, (Feb. 1, 2010), 3 pages.

"Advisory Action", U.S. Appl. No. 11/935,222, (Feb. 4, 2010), 3 pages.

"Restriction Requirement", U.S. Appl. No. 12/368,263, (Mar. 9, 2010), 7 pages.
"Notice of Allowance", U.S. Appl. No. 10/705,199, (Mar. 10, 2010), 18 pages.
"Non Final Office Action", U.S. Appl. No. 11/691,686, (Mar. 18, 2010), 17 pages.
Robertson, et al., ""The Document Lens"", (1993),pp. 101-108.
"Non Final OA", U.S. Appl. No. 11/935,222, (Feb. 20, 2009),12 pages.
Carpendale, M.S.T et al., ""A Framework for Unifying Presentation Space"", *01UIST. Proceedings of the 14th Annual ACM Symposium on User Interface Software and Technology, Proceedings of UIST '01: ACM Symposium on User Interface Software and Technology*, Orlando, FL, USA; XP002249323 2001, New York, NY, USA, ISBN: 1-58113-438-X,(Nov. 14, 2001),pp. 61-70; p. 64.
Ikedo, T ""A Realtime Video-Image Mapping User Polygon Rendering Techniques"", *IEEE Intl. conf on* Ottawa, Ont, Canada Jun. 3-6, 1997, Los Alamitos, CA, USA; IEEE Comput. Soc, US, XP010239181, ISBN: 0-8186-7819-4 Sections 2, 4.4; Multimedia Computing and Systems '97 Proceedings,(Jun. 3, 1997),pp. 127-134.
Bouju, A. et al., ""Client-Server Architecture for Accessing Multimedia and Geographic Databases within Embedded Systems"", *Database and Expert Systems Applications, 1999 Proceedings. Tenth International Workshop on* Florence, Italy Sep. 1-3, 1999, Los Alamitos, CA, USA, IEEE Comput. Soc, US, XP010352370; ISBN:0-7695-0281-4, abstract, figure 2,(Sep. 1-3, 1999),pp. 760-764.
Robertson, G et al., "The Document Lens", *UIST. Proceedings of the Annual ACM Symposium on User Interface Software and Technology*, abstract figures 3,4,(Nov. 3, 1993),pp. 101-108.
Dursteler, Juan C., "The digital magazine of InfoVis.net", Retrieved from: http://www.infovis.net/printMag.php?num=85&lang=2; (Apr. 22, 2002).
"Presentation for CGDI Workshop", Retrieved from: http://www.geoconnections.org/developersCorner/devCorner_devNetwork/meetings/2002.05.30/IDELIX_CGDI_20020530_dist.pdf, (May 2002).
Kuederle, Oliver ""Presentation of Image Sequences: A Detail-In-Context Approach"", *Thesis*, Simon Fraser University; (Aug. 2000),pp. 1-3, 5-10, 29-31.
Microsoft Corp., "Microsoft Paint", Microsoft Corp.,(1981-1998),Paint 1-14.
"Electronic Magnifying Glasses", *IBM Technical Disclosure Bulletin*, IBM Corp., New York, US, vol. 37, No. 3; XP000441501, ISSN: 0018-8689 the whole document; (Mar. 1, 1994),pp. 353-354.
Keahey, T. A., ""The Generalized Detail-In-Context Problem"", *Information Visualization 1998, Proceedings; IEEE Symposium on Research* Triangle, CA, USA; Los Alamitos, CA, USA, IEEE Comput. Soc, US; XP010313304; ISBN: 0-8186-9093,(Oct. 19-20, 1998),pp. 44-51, 152.
Carpendale, et al., ""3-Dimensional Pliable Surfaces: For the Effective Presentation of Visual Information"", *Proceedings of the 8th annual ACM symposium on User interface and software technology*; (Dec. 1995).
Carpendale, M S T et al., ""Extending distortion viewing from 2D to 3D"", *IEEE Computer Graphics and Applications*, IEEE Inc. New York, US, vol. 17, No. 4; XP000927815, ISSN: 0272-1716. (Jul. 1997),pp. 42-51.
Viega, J et al., ""3D magic lenses"", *Proceedings of the 9th annual ACM symposium on User interface software and technology*; Pub 1996 ACM Press New York, NY, USA; (1996),51-58.
Cowperthwaite, David J., ""Occlusion Resolution Operators for Three-Dimensional Detail-In-Context"", Burnaby, British Columbia: Simon Fraser University; (2000).
Carpendale, M.S.T. ""A Framework for Elastic Presentation Space"", *Thesis* Simon Fraser University, XP001051168; Chapter 3-5; appendix A,B; (Mar. 1999),pp. 1-271.
Carpendale, M.S.T. et al., ""Exploring Distinct Aspects of the Distortion Viewing Paradigm"", *Technical Report TR 97-08*, School of Computer Science, Simon Fraser University, Burnaby, British Columbia, Canada; (Sep.1997).

Cowperthwaite, David J., et al., ""Visual Access for 3D Data"", in *Proceedings of ACM CHI 96 Conference on Human Factors in Computer Systems, vol. 2 of Short Papers: Alternative Methods of Interaction*; (1996),pp. 175-176.
Keahey, T. A., ""Visualization of High-Dimensional Clusters Using NonLinear Magnification"", *Technical Report LA-UR-98-2776*, Los Alamos National Laboratory; (1998).
Tigges, M. et al., ""Generalized Distance Metrics for Implicit Surface Modeling"", *Proceedings of the Tenth Western Computer Graphics Symposium*; (Mar. 1999).
Bossen, F. J., ""Anisotropic Mesh Generation With Particles"", *Technical Report CMU-CS-96-134*, CS Dept, Carnegie Mellon University; (May 1996).
Bossen, F. J., et al., ""A Pliant Method for Anisotropic Mesh Generation"", *5th Intl. Meshing Roundtable*; (Oct. 1996),pp. 63-74.
Wilson, et al., ""Direct Volume Rendering Via 3D Textures"", *Technical Report UCSC-CRL-94-19*, University of California, Santa Cruz, Jack Baskin School of Engineering; (Jun. 1994).
Carpendale, M.S.T. "A Framework for Elastic Presentation Space", *PhD thesis*, Simon Fraser University; (1999),pp. 69, 72, 78-83,98-100, 240, and 241.
Keahey, T. A., et al., ""Techniques for Non-Linear Magnification Transformations"", *Information Visualization '96, Proceedings IEEE Symposium on*, San Francisco, CA, Los Alamitos, CA, USA, IEEE Comput. Soc, US: XP010201943; ISBN: 0-8186-7668-X the whole document,(Oct. 28, 1996),pp. 38-45.
Carpendale, M. Sheelagh T., et al., ""3-Dimensional Pliable Surfaces: For the Effective Presentation of Visual Information"", *UIST '95, 8th Annual ACM Symposium on User Interface Software and Technology, Proceedings of the ACM Symposium on User Interface Software and Technology*, Pittsburgh, PA, *ACM Symposium on User Interface Software and Technology*, New York, Nov. 14, 1995,pp. 217-226.
Tominski, Christian et al., ""Fisheye Tree Views and Lenses for Graph Visualization"", pp. 1-8.
Keahey, T. A., ""Getting Along: Composition of Visualization Paradigms"", *Visual Insights, Inc.*; (2001).
Sakamoto, Chikara et al., ""Design and Implementation of a Parallel Pthread Library (PPL) with Parallelism and Portability"", *Systems and Computers* in Japan, New York, US, vol. 29, No. 2; XP000752780, ISSN: 0882-1666 abstract,(Feb. 1, 1998),pp. 28-35.
Deng, K. et al., ""Texture Mapping with a Jacobian-Based Spatially-Variant Filter",", *Proceedings 10th Pacific Conference on Computer Graphics and Applications*, Beijing, China, 2002 Los Alamitos, CA, USA, IEEE Comput. Soc, USA; XP00224932, ISBN; 0-7695-1784-6 the whole document,(Oct. 9-11, 2002),pp. 460-461.
Welsh, Michelle "Futurewave Software", *Business Wire*; (Nov. 15, 1993).
Lamar, et al., "A Magnification Lens for Interactive Volume Visualization", *ACM*; pp. 1-10.
Fitzmaurice, G. et al., ""Tracking Menus"", *UIST*; (2003),pp. 71-79.
Stone, et al., "The movable filter as a user interface tool", *Proceedings of CHI ACM*; (1992),pp. 306-312.
Baudisch, P. et al., ""Halo: a Technique for Visualizing Off-Screen Locations"", *CHI*; (Apr. 5-10, 2003).
Baudisch, P. et al., ""Drag-And-Pop: Techniques for Accessing Remote Screen Content on Touch-And-Pen-Operated Systems"", *Interact '03*, (2003).
Carpendale, M.S.T. et al., ""Making Distortions Comprehensible"", *Visual Languages, Proceedings, 1997 IEEE Symposium* on Isle of Capri, Italy, Sep. 23-26, 1997, Los Alamitos, CA, USA, IEEE Comput. Soc., US, Sep. 23, 1997; XP010250566, ISBN: 0-8186-8144-6,(Sep. 23-26, 1997),pp. 36-45.
Ito, Minoru et al., ""A Three-Level Checkerboard Pattern (TCP) Projection Method for Curved Surface Measurement"", *Pattern Recognition*, Pergamon Press Inc., Elmsford, N.Y., US vol. 28, No. 1; XP004014030, ISSN 0031-3203,(1995),pp. 27-40.
Keahey, T A., et al., ""Nonlinear Magnification Fields"", *Information Visualization, 1997, Proceedings, IEEE Symposium* on Phoenix, AZ, USA, Los Alamitos, CA, USA, IEEE Comput. Soc., US; XP010257169; ISBN: 0-8186-8189-6,(Oct. 20-21, 1997),pp. 51-58 and 121.

Rauschenbach, U. """The Rectangular Fish Eye View as an Efficient Method for the Transmission and Display of Large Images""", *Image Processing, ICIP 99, Proceedings, 1999 International Conference on*, Kobe, Japan, Oct. 24-28, 1999, Piscataway, NJ, USA, IEEE, US, XP010368852, ISBN 0-7803-5467-2 p. 115, left-hand col.—p. 116, paragraph 3, p. 118, paragraph 7.1; (1999),pp. 115-119.

Keahey, T. A., "Nonlinear Magnification", (*Indiana University Computer Science*), (1997).

Watt, et al., "Advanced Animation and Rendering Techniques", (*Addison-Wesley Publishing*), (1992),p. 106-108.

Boots, B. N., "Delauney Triangles: An Alternative Approach to Point Pattern Analysis", *Proc. Assoc. Am. Geogr. 6*, (1974),p. 26-29.

Sheelagh, M. et al., ""Distortion Viewing Techniques for 3-Dimensional Data"", *Information Visualization '96, Proceedings IEEE Symposium* on San Francisco, CA, USA, Los Alamitos, CA, USA, *IEEE Comput. Soc*, US Oct. 28, 1996; XP010201944; ISBN: 0-8186-7668-X,(Oct. 28-29, 1996),pp. 46-53, 119.

Leung, Y. K., et al., ""A Review and Taxonomy of Distortion-Oriented Presentation Techniques"", *ACM Transactions on Computer-Human Interaction*, 'Online! vol. 1, No. 2, XP002252314; Retrieved from the Internet: <URL:http://citeseer.nj.nec.com/ leung94review.html> 'retrieved on Aug. 21, 2003! the whole document,(Jun. 1994),pp. 126-160.

"Non Final Office Action", U.S. Appl. No. 10/358,394, (Mar. 13, 2009).

Sarkar, et al., "Stretching the Rubber Sheet: A Metaphor for Viewing Large Layouts on Small Screens", *Proc. of the 6th annual ACM symp. on User interface software an technology*, Atlanta, GA, (Dec. 1993),p. 81-91.

Carpendale, et al., "Graph Folding: Extending Detail and Context Viewing into a Tool for Subgraph Comparisons", *In Proceedings of Graph Drawing 1995*, Passau, Germany, (1995),pp. 127-139.

Carpendale, M.S.T. "A Framework for Elastic Presentation Space", http://paqes.cpsc.ucalqary.ca/~sheelagh/personal/thesis/, (Nov. 19, 1999).

"Non Final Office Action", U.S. Appl. No. 11/542,120, (Jan. 22, 2009),20 pages.

"Advisory Action", U.S. Appl. No. 11/673,038, (Mar. 25, 2010), 3 pages.

"Final Office Action", U.S. Appl. No. 11/159,205, (Mar. 25, 2010), 16 pages.

"Notice of Allowance", U.S. Appl. No. 12/364,450, (Apr. 19, 2010), 4 pages.

"Non-Final Office Action", U.S. Appl. No. 11/236,694, (Apr. 20, 2010), 9 pages.

"Non Final Office Action", U.S. Appl. No. 12/368,263, (Apr. 30, 2010), 8 pages.

Carpendale, Marianne S. T., "A Framework for Elastic Presentation Space" (Burnaby, British Columbia, Canada: Simon Fraser University, 1999).

"Non-Final Office Action", U.S. Appl. No. 11/410,024, (Mar. 11, 2009),35 pages.

"Foreign Office Action", Application Serial No. 2002-536993, (Mar. 11, 2009),2 pages.

"Notice of Allowance", U.S. Appl. No. 11/401,349, (Apr. 17, 2009),35 pages.

Schmalstieg, Dieter et al., "Using transparent props for interaction with the virtual table", U.S. Appl. No. 11/410,024, Proceedings of the 1999 symposium on Interactive 3D graphics.,(Apr. 26, 1999),8 pages.

"Non Final Office Action", U.S. Appl. No. 10/705,199, (May 12, 2009),46 pages.

"Non Final Office Action", U.S. Appl. No. 12/368,267, (Jun. 11, 2010), 12 pages.

"Notice of Allowability", U.S. Appl. No. 12/364,450, (Jun. 18, 2010), 2 pages.

"Non Final Office Action", U.S. Appl. No. 12/388,437, (Jun. 23, 2010), 7 pages.

"Non Final Office Action", U.S. Appl. No. 12/764,724, (Jul. 1, 2010), 20 pages.

"Non Final Office Action", U.S. Appl. No. 11/673,038, (Jul. 22, 2010), 39 pages.

"Non Final Office Action", U.S. Appl. No. 11/541,778, (Jun. 19, 2009),36 pages.

"Non Final Office Action", U.S. Appl. No. 11/673,038, (Jul. 13, 2009),45 pages.

"Non Final Office Action", U.S. Appl. No. 11/410,024, (Jul. 20, 2009),27 pages.

Smith, et al., "Efficient techniques for wide-angle stereo vision using surface projection models", Retrieved from <http://ieee.org/stamp.jsp?arnumber=17045, (1999),6 pages.

"Non Final Office Action", U.S. Appl. No. 11/159,205, (Jul. 27, 2009),28 pages.

"Advisory Action", U.S. Appl. No. 11/249,493, (Aug. 11, 2009),5 pages.

"Advisory Action", U.S. Appl. No. 10/705,199, (Aug. 18, 2009),5 pages.

"Restriction Requirement", U.S. Appl. No. 11/935,222, (Aug. 20, 2009),6 pages.

"Advisory Action", U.S. Appl. No. 11/249,493, (Sep. 14, 2009),4 pages.

"Non-Final Office Action", U.S. Appl. No. 12/364,450, (Sep. 30, 2009),10 pages.

"Notice of Allowance", U.S. Appl. No. 10/358,394, (Oct. 8, 2009),8 pages.

"Final Office Action", U.S. Appl. No. 11/691,686, (Sep. 1, 2010),16 pages.

"Non Final Office Action", U.S. Appl. No. 11/541,778, (Sep. 29, 2010),10 pages.

"Non Final Office Action", U.S. Appl. No. 11/695,104, (Oct. 1, 2010), 9 pages.

"Final Office Action", U.S. Appl. No. 11/159,205, (Oct. 6, 2010),16 pages.

"Non Final Office Action", U.S. Appl. No. 11/236,694, (Oct. 13, 2010),16 pages.

Lieberman, Henry "Power of Ten Thousand—Navigating in Large Information Spaces", *Proceedings of the 7th annual ACM symposium on User interface software technology*, Marina del Rey, California, United States, (Nov. 1994), pp. 15-16.

Mills, Michael et al., "A Magnifier Tool for Video Data", *Proceedings of the SIGCHI conference on Human factors in computing systems*, (1992), pp. 93-96.

Kline, Richard L., et al., "Improving GUI Accessibility for People with Low Vision", *Proceedings of the SIGCHI conference on Human factors in computing systems*, (1995), pp. 114-121.

Perlin, Ken et al., "Pad—an alternative approach to the computer interface", *International Conference on Computer Graphics and Interactive Techniques. Proceedings of the 20th annual conference on Computer graphics and interactive techniques*., (1993), pp. 57-64.

Bier, Eric A., et al., "The Movable Filter as a User Interface Tool—The Video", *Conference on Human Factors in Computing Systems Conference companion on Human factors in computing systems*, (1995), pp. 413-414.

Bier, Eric A., et al., "Toolglass and Magic Lenses—The See-Through Interface", *International Conference on Computer Graphics and Interactive Techniques Proceedings of the 20th annual conference on Computer graphics and interactive techniques*, (1993), pp. 73-80.

Bier, Eric A., et al., "Toolglass and Magic Lenses—The See-Through Interface", *Conference on Human Factors in Computing Systems Conference companion on Human factors in computing systems*, (1994), pp. 445-446.

Kamba, Tomonari et al., "Using Small Screen Space More Efficiently", *CHI 96*Vancouver, BC Canada, (1996),pp. 383-390.

"Final Office Action", U.S. Appl. No. 12/368,263, (Nov. 5, 2010), 7 pages.

"Final Office Action", U.S. Appl. No. 12/764,724, (Nov. 9, 2010), 21 pages.

"Final Office Action", U.S. Appl. No. 11/691,686, (Nov. 22, 2010),16 pages.

\* cited by examiner

GRAPHICAL USER INTERFACES AND OCCLUSION PREVENTION FOR FISHEYE LENSES WITH LINE SEGMENT FOCI

This application claims priority from U.S. Provisional Patent Application No. 60/574,931, filed May 28, 2004, and incorporated herein by reference.

FIELD OF THE INVENTION

This invention relates to the field of computer graphics processing, and more specifically, to a method and system for adjusting detail-in-context lenses in detail-in-context presentations with graphical user interfaces while reducing occlusion.

BACKGROUND OF THE INVENTION

Modern computer graphics systems, including virtual environment systems, are used for numerous applications such as flight training, surveillance, and even playing computer games. In general, these applications are launched by the computer graphics system's operating system upon selection by a user from a menu or other graphical user interface ("GUI"). A GUI is used to convey information to and receive commands from users and generally includes a variety of GUI objects or controls, including icons, toolbars, drop-down menus, text, dialog boxes, buttons, and the like. A user typically interacts with a GUI by using a pointing device (e.g., a mouse) to position a pointer or cursor over an object and "clicking" on the object.

One problem with these computer graphics systems is their inability to effectively display detailed information for selected graphic objects when those objects are in the context of a larger image. A user may require access to detailed information with respect to an object in order to closely examine the object, to interact with the object, or to interface with an external application or network through the object. For example, the detailed information may be a close-up view of the object or a region of a digital map image.

While an application may provide a GUI for a user to access and view detailed information for a selected object in a larger image, in doing so, the relative location of the object in the larger image may be lost to the user. Thus, while the user may have gained access to the detailed information required to interact with the object, the user may lose sight of the context within which that object is positioned in the larger image. This is especially so when the user must interact with the GUI using a computer mouse or keyboard. The interaction may further distract the user from the context in which the detailed information is to be understood. This problem is an example of what is often referred to as the "screen real estate problem".

A need therefore exists for an improved method and system for adjusting detailed views of selected information within the context of surrounding information presented on the display of a computer graphics system. Accordingly, a solution that addresses, at least in part, the above and other shortcomings is desired.

SUMMARY OF THE INVENTION

According to one aspect of the invention, there is provided a method for generating a presentation of a region-of-interest in an original image for display on a display screen, comprising: establishing a lens for the region-of-interest, the lens having a magnified focal region for the region-of-interest at least partially surrounded by a shoulder region having diminishing magnification, the focal region having a perimeter defined by a radius r from a line segment; receiving one or more signals to adjust at least one of the radius r and a length len of the line segment to thereby adjust the perimeter; and, applying the lens to the original image to produce the presentation.

According to another aspect of the invention, there is provided a method in a computer system for reducing occlusion in a presentation of a region-of-interest of an original image, the presentation generated by applying a lens to the original image, the lens having a bounds and a focal region with a magnification m for the region-of-interest at least partially surrounded by a shoulder region having diminishing magnification and a width sw, the focal region having a perimeter defined by a radius r from a line segment having a length len, the method comprising: determining a maximum radius maxr for defining the perimeter of the focal region from a distance dl between a point near the bounds of the lens and a nearest point on the line segment, the magnification m, and the width sw of the shoulder region, wherein maxr=sw/(m−1)−dl; and, restricting adjustment of the radius r to below the maximum radius maxr to thereby reduce occlusion of the shoulder region by the focal region.

In accordance with further aspects of the present invention there is provided an apparatus such as a data processing system, a method for adapting this system, as well as articles of manufacture such as a computer readable medium having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Figure 1:
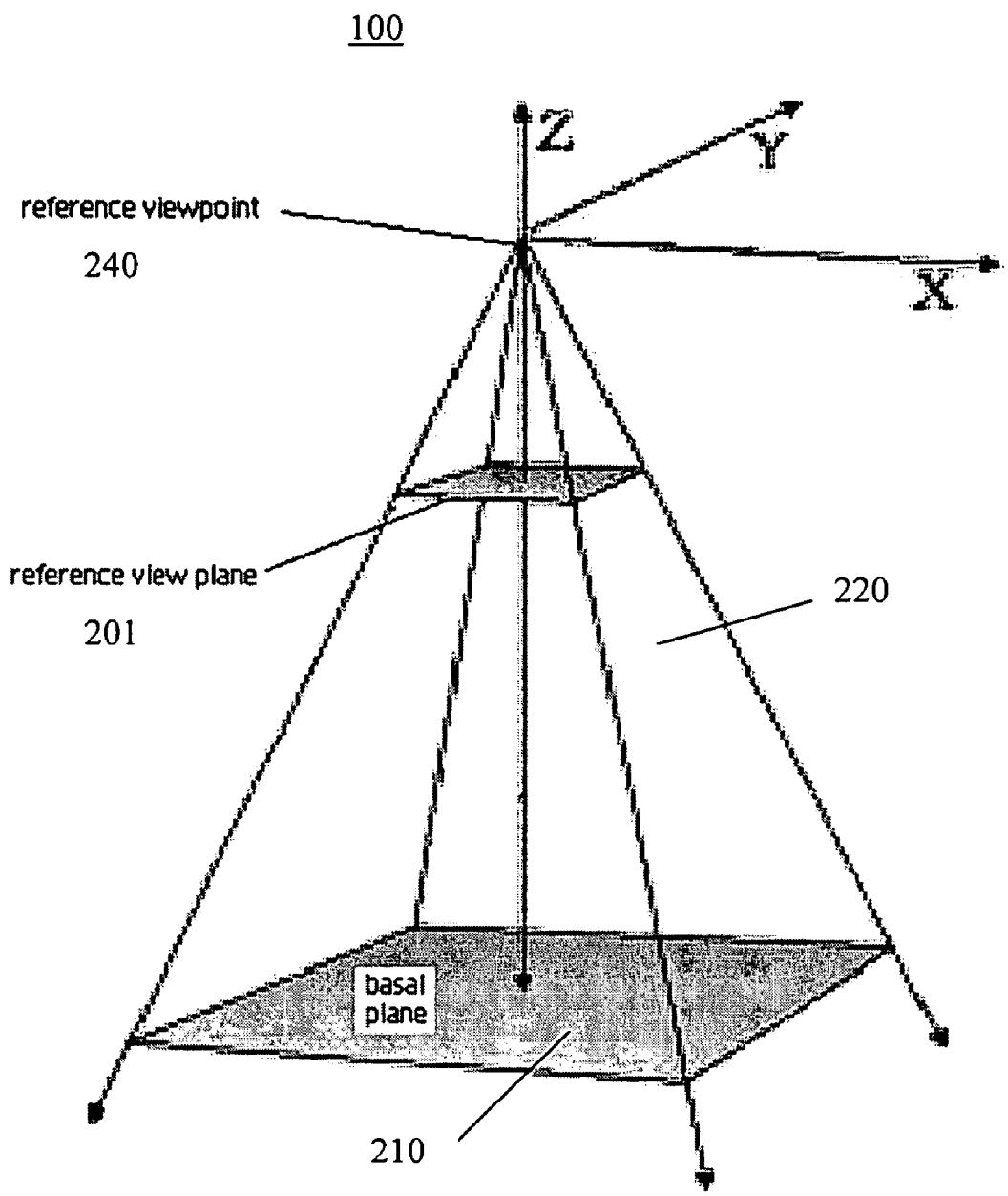
FIG. 1 is a graphical representation of the geometry for constructing a three-dimensional perspective viewing frustum, relative to an x, y, z coordinate system, in accordance with elastic presentation space graphics technology.

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention. The term "data processing system" is used herein to refer to any machine for processing data, including the computer systems and network arrangements described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention.

The "screen real estate problem" generally arises whenever large amounts of information are to be displayed on a display screen of limited size. Known tools to address this problem include panning and zooming. While these tools are suitable for a large number of visual display applications, they become less effective where sections of the visual information are spatially related, such as in layered maps and three-dimensional representations, for example. In this type of information display, panning and zooming are not as effective as much of the context of the panned or zoomed display may be hidden.

A recent solution to this problem is the application of "detail-in-context" presentation techniques. Detail-in-context is the magnification of a particular region-of-interest (the "focal region" or "detail") in a data presentation while preserving visibility of the surrounding information (the "context"). This technique has applicability to the display of large surface area media (e.g. digital maps) on computer screens of variable size including graphics workstations, laptop computers, personal digital assistants ("PDAs"), and cell phones.

In the detail-in-context discourse, differentiation is often made between the terms "representation" and "presentation". A representation is a formal system, or mapping, for specifying raw information or data that is stored in a computer or data processing system. For example, a digital map of a city is a representation of raw data including street names and the relative geographic location of streets and utilities. Such a representation may be displayed visually on a computer screen or printed on paper. On the other hand, a presentation is a spatial organization of a given representation that is appropriate for the task at hand. Thus, a presentation of a representation organizes such things as the point of view and the relative emphasis of different parts or regions of the representation. For example, a digital map of a city may be presented with a region magnified to reveal street names.

In general, a detail-in-context presentation may be considered as a distorted view (or distortion) of a portion of the original representation or image where the distortion is the result of the application of a "lens" like distortion function to the original representation. A detailed review of various detail-in-context presentation techniques such as "Elastic Presentation Space" ("EPS") (or "Pliable Display Technology" ("PDT")) may be found in a publication by Marianne S. T. Carpendale, entitled "A Framework for Elastic Presentation Space" (Carpendale, Marianne S. T., *A Framework for Elastic Presentation Space* (Burnaby, British Columbia: Simon Fraser University, 1999)), and incorporated herein by reference.

In general, detail-in-context data presentations are characterized by magnification of areas of an image where detail is desired, in combination with compression of a restricted range of areas of the remaining information (i.e. the context), the result typically giving the appearance of a lens having been applied to the display surface. Using the techniques described by Carpendale, points in a representation are displaced in three dimensions and a perspective projection is used to display the points on a two-dimensional presentation display. Thus, when a lens is applied to a two-dimensional continuous surface representation, for example, the resulting presentation appears to be three-dimensional. In other words, the lens transformation appears to have stretched the continuous surface in a third dimension. In EPS graphics technology, a two-dimensional visual representation is placed onto a surface; this surface is placed in three-dimensional space; the surface, containing the representation, is viewed through perspective projection; and the surface is manipulated to effect the reorganization of image details. The presentation transformation is separated into two steps: surface manipulation or distortion and perspective projection.

FIG. 1 is a graphical representation of the geometry 100 for constructing a three-dimensional ("3D") perspective viewing frustum 220, relative to an x, y, z coordinate system, in accordance with elastic presentation space (EPS) graphics technology. In EPS technology, detail-in-context views of two-dimensional ("2D") visual representations are created with sight-line aligned distortions of a 2D information presentation surface within a 3D perspective viewing frustum 220. In EPS, magnification of regions of interest and the accompanying compression of the contextual region to accommodate this change in scale are produced by the movement of regions of the surface towards the viewpoint ("VP") 240 located at the apex of the pyramidal shape 220 containing the frustum. The process of projecting these transformed layouts via a perspective projection results in a new 2D layout which includes the zoomed and compressed regions. The use of the third dimension and perspective distortion to provide magnification in EPS provides a meaningful metaphor for the process of distorting the information presentation surface. The 3D manipulation of the information presentation surface in such a system is an intermediate step in the process of creating a new 2D layout of the information.

Figure 2:
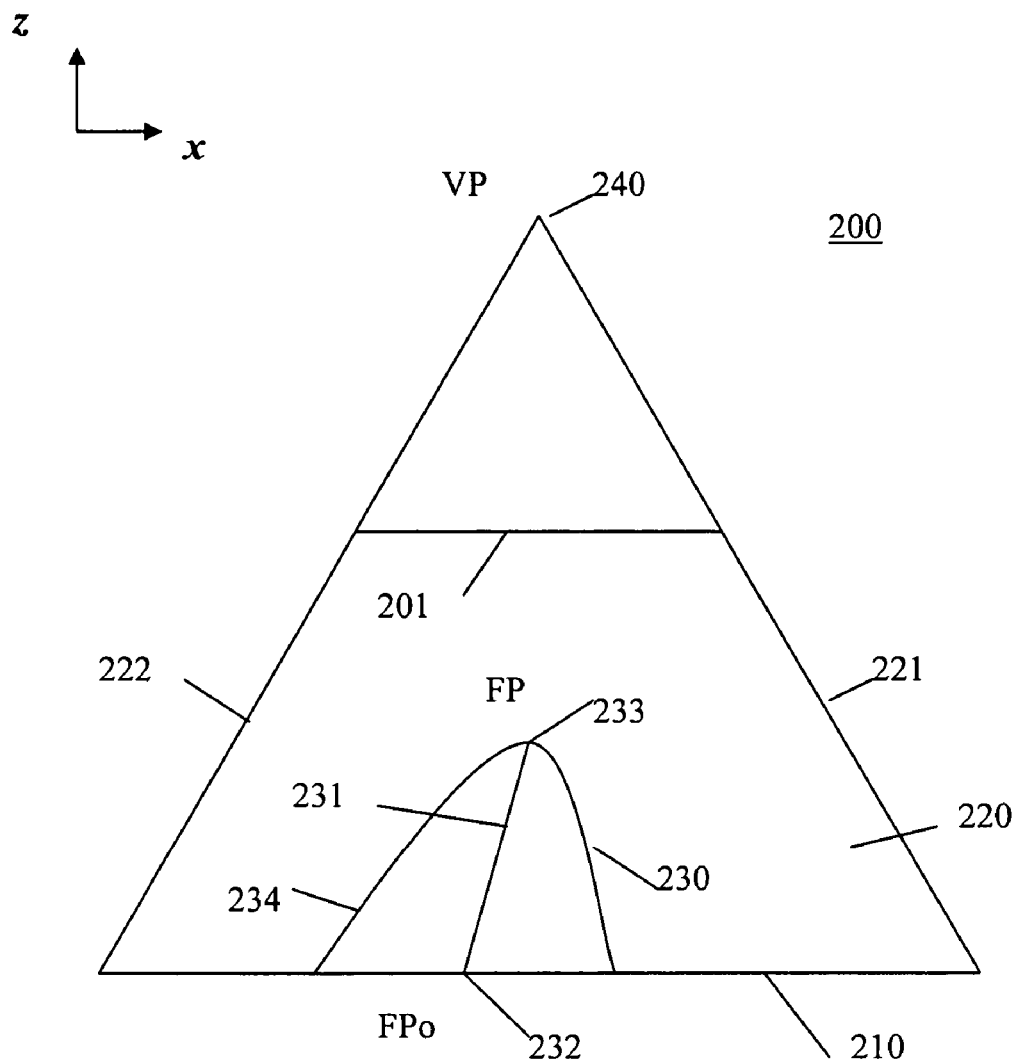
FIG. 2 is a graphical representation of the geometry of a presentation in accordance with elastic presentation space graphics technology.

FIG. 2 is a graphical representation of the geometry 200 of a presentation in accordance with EPS graphics technology. EPS graphics technology employs viewer-aligned perspective projections to produce detail-in-context presentations in a reference view plane 201 which may be viewed on a display. Undistorted 2D data points are located in a basal plane 210 of a 3D perspective viewing volume or frustum 220 which is defined by extreme rays 221 and 222 and the basal plane 210. The VP 240 is generally located above the centre point of the basal plane 210 and reference view plane ("RVP") 201. Points in the basal plane 210 are displaced upward onto a distorted surface 230 which is defined by a general 3D distortion function (i.e. a detail-in-context distortion basis function). The direction of the perspective projection corresponding to the distorted surface 230 is indicated by the line FPo-FP 231 drawn from a point FPo 232 in the basal plane 210 through the point FP 233 which corresponds to the focus or focal region or focal point of the distorted surface 230. Typically, the perspective projection has a direction 231 that is viewer-aligned (i.e., the points FPo 232, FP 233, and VP 240 are collinear).

EPS is applicable to multidimensional data and is well suited to implementation on a computer for dynamic detail-in-context display on an electronic display surface such as a monitor. In the case of two dimensional data, EPS is typically characterized by magnification of areas of an image where detail is desired 233, in combination with compression of a restricted range of areas of the remaining information (i.e. the context) 234, the end result typically giving the appearance of a lens 230 having been applied to the display surface. The areas of the lens 230 where compression occurs may be referred to as the "shoulder" 234 of the lens 230. The area of the representation transformed by the lens may be referred to as the "lensed area". The lensed area thus includes the focal region and the shoulder. To reiterate, the source image or representation to be viewed is located in the basal plane 210. Magnification 233 and compression 234 are achieved through elevating elements of the source image relative to the basal plane 210, and then projecting the resultant distorted surface onto the reference view plane 201. EPS performs detail-in-context presentation of n-dimensional data through the use of a procedure wherein the data is mapped into a region in an (n+1) dimensional space, manipulated through perspective projections in the (n+1) dimensional space, and then finally transformed back into n-dimensional space for presentation. EPS has numerous advantages over conventional zoom, pan, and scroll technologies, including the capability of preserving the visibility of information outside 234 the local region of interest 233.

For example, and referring to FIGS. 1 and 2, in two dimensions, EPS can be implemented through the projection of an image onto a reference plane 201 in the following manner. The source image or representation is located on a basal plane 210, and those regions of interest 233 of the image for which magnification is desired are elevated so as to move them closer to a reference plane situated between the reference viewpoint 240 and the reference view plane 201. Magnification of the focal region 233 closest to the RVP 201 varies inversely with distance from the RVP 201. As shown in FIGS. 1 and 2, compression of regions 234 outside the focal region 233 is a function of both distance from the RVP 201, and the gradient of the function describing the vertical distance from the RVP 201 with respect to horizontal distance from the focal region 233. The resultant combination of magnification 233 and compression 234 of the image as seen from the reference viewpoint 240 results in a lens-like effect similar to that of a magnifying glass applied to the image. Hence, the various functions used to vary the magnification and compression of the source image via vertical displacement from the basal plane 210 are described as lenses, lens types, or lens functions. Lens functions that describe basic lens types with point and circular focal regions, as well as certain more complex lenses and advanced capabilities such as folding, have previously been described by Carpendale.

Figure 3:
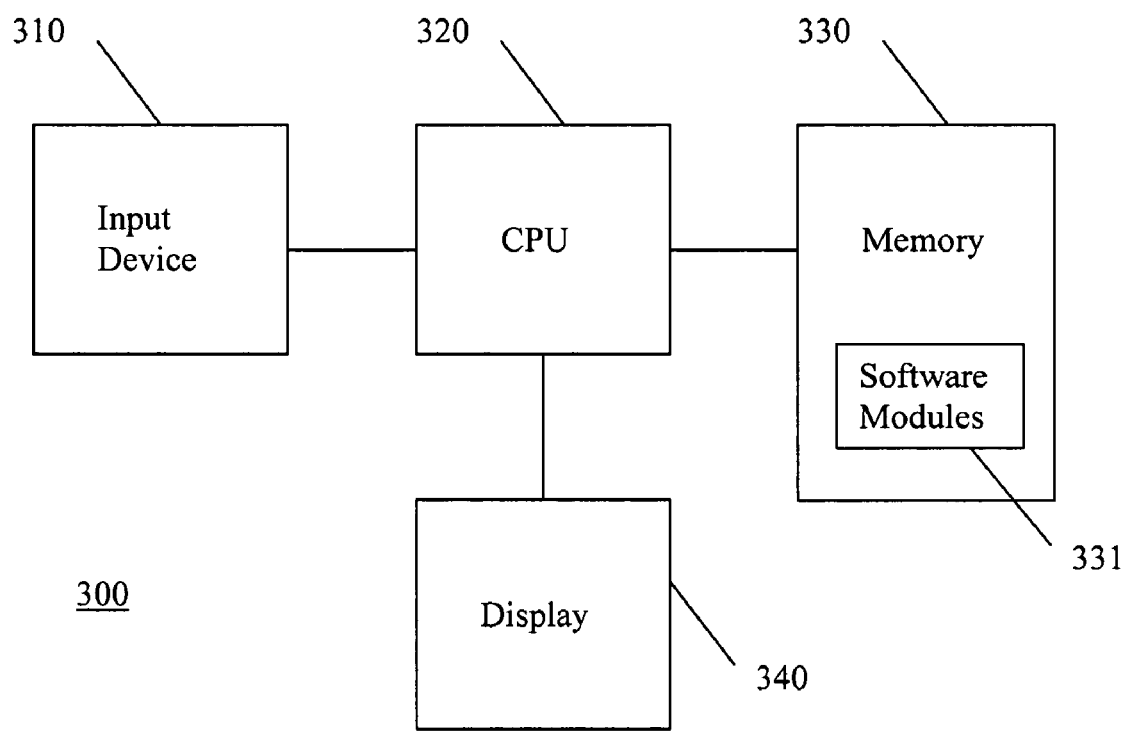
FIG. 3 is a block diagram illustrating a data processing system adapted for implementing an embodiment of the invention.

FIG. 3 is a block diagram of a data processing system 300 adapted to implement an embodiment of the invention. The data processing system 300 is suitable for implementing EPS technology, for displaying detail-in-context presentations of representations in conjunction with a detail-in-context graphical user interface (GUI) 400, as described below, and for adjusting detail-in-context lenses in detail-in-context presentations while reducing occlusion. The data processing system 300 includes an input device 310, a central processing unit ("CPU") 320, memory 330, and a display 340. The input device 310 may include a keyboard, a mouse, a pen and tablet, a trackball, an eye tracking device, a position tracking device, or a similar device. The CPU 320 may include dedicated coprocessors and memory devices. The memory 330 may include RAM, ROM, databases, or disk devices. And, the display 340 may include a computer screen, terminal device, or a hardcopy producing output device such as a printer or plotter. The data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more software modules 331 resident in the memory 330 of the data processing system 300. Alternatively, the programmed instructions may be embodied on a computer readable medium (such as a CD disk or floppy disk) which may be used for transporting the programmed instructions to the memory 330 of the data processing system 300. Alternatively, the programmed instructions may be embedded in a computer-readable, signal-bearing medium that is uploaded to a network by a vendor or supplier of the programmed instructions, and this signal-bearing medium may be downloaded through an interface to the data processing system 300 from the network by end users or potential buyers.

As mentioned, detail-in-context presentations of data using techniques such as pliable surfaces, as described by Carpendale, are useful in presenting large amounts of information on limited-size display surfaces. Detail-in-context views allow magnification of a particular region-of-interest (the "focal region") 233 in a data presentation while preserving visibility of the surrounding information 210. In the following, GUIs are described having lens control elements that can be implemented in software and applied to the editing of multi-layer images and to the control of detail-in-context data presentations. The software can be loaded into and run by the data processing system 300 of FIG. 3.

Figure 4:
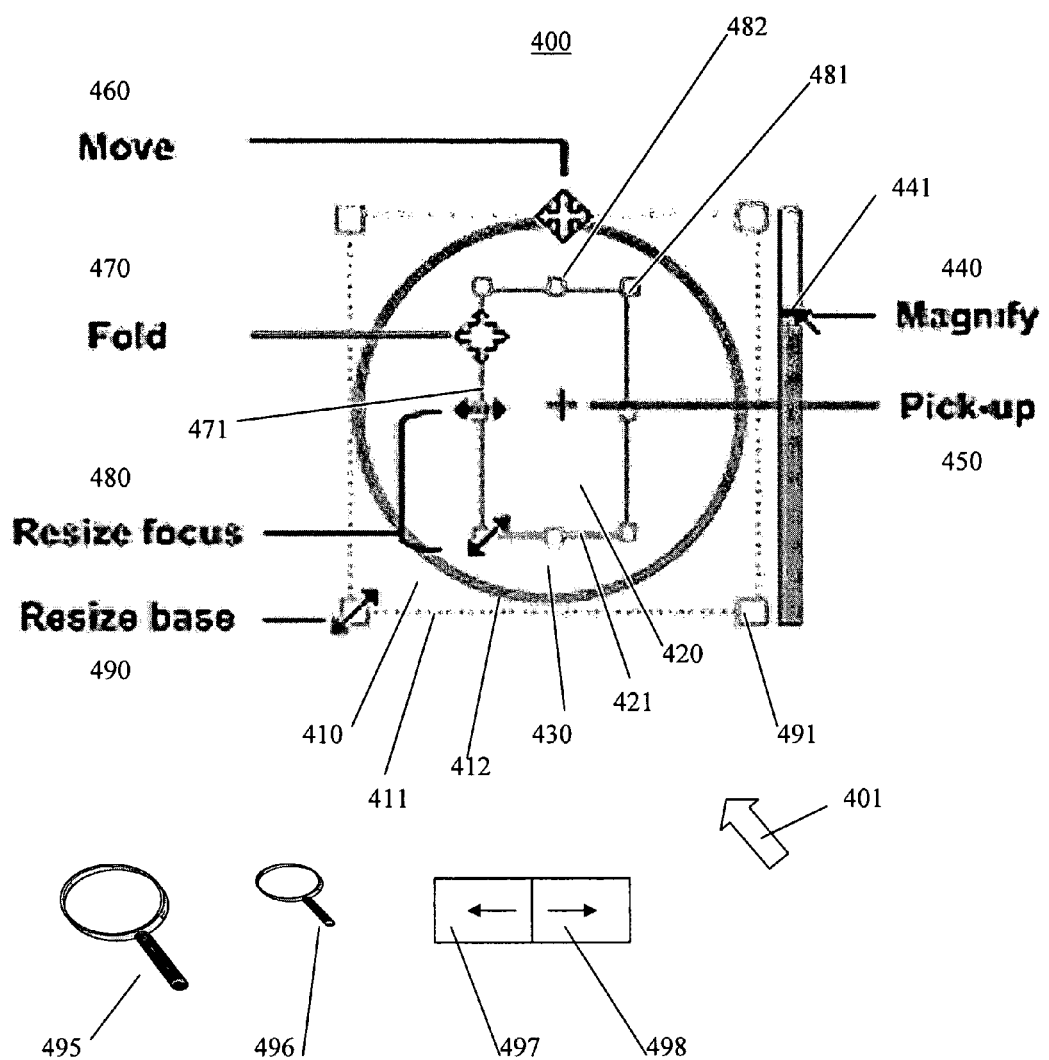
FIG. 4 is a partial screen capture illustrating a GUI having lens control elements for user interaction with detail-in-context data presentations in accordance with an embodiment of the invention.

FIG. 4 is a partial screen capture illustrating a GUI 400 having lens control elements for user interaction with detail-in-context data presentations in accordance with an embodiment of the invention. Detail-in-context data presentations are characterized by magnification of areas of an image where detail is desired, in combination with compression of a restricted range of areas of the remaining information (i.e. the context), the end result typically giving the appearance of a lens having been applied to the display screen surface. This lens 410 includes a "focal region" 420 having high magnification, a surrounding "shoulder region" 430 where information is typically visibly compressed, and a "base" 412 surrounding the shoulder region 430 and defining the extent of the lens 410. In FIG. 4, the lens 410 is shown with a circular shaped base 412 (or outline) and with a focal region 420 lying near the center of the lens 410. However, the lens 410 and focal region 420 may have any desired shape. For example, in FIG. 5, the lens 410 has an oblong shape. As mentioned above, the base of the lens 412 may be coextensive with the focal region 420.

In general, the GUI 400 has lens control elements that, in combination, provide for the interactive control of the lens 410. The effective control of the characteristics of the lens 410 by a user (i.e., dynamic interaction with a detail-in-context lens) is advantageous. At any given time, one or more of these lens control elements may be made visible to the user on the display surface 340 by appearing as overlay icons on the lens 410. Interaction with each element is performed via the motion of an input or pointing device 310 (e.g., a mouse) with the motion resulting in an appropriate change in the corresponding lens characteristic. As will be described, selection of which lens control element is actively controlled by the motion of the pointing device 310 at any given time is determined by the proximity of the icon representing the pointing device 310 (e.g. cursor) on the display surface 340 to the appropriate component of the lens 410. For example, "dragging" of the pointing device at the periphery of the bounding rectangle of the lens base 412 causes a corresponding change in the size of the lens 410 (i.e. "resizing"). Thus, the GUI 400 provides the user with a visual representation of which lens control element is being adjusted through the display of one or more corresponding icons.

For ease of understanding, the following discussion will be in the context of using a two-dimensional pointing device 310 that is a mouse, but it will be understood that the invention may be practiced with other 2D or 3D (or even greater numbers of dimensions) pointing devices including a trackball, a pen and tablet, a keyboard, an eye tracking device, and a position tracking device.

A mouse 310 controls the position of a cursor icon 401 that is displayed on the display screen 340. The cursor 401 is moved by moving the mouse 310 over a flat surface, such as the top of a desk, in the desired direction of movement of the cursor 401. Thus, the two-dimensional movement of the mouse 310 on the flat surface translates into a corresponding two-dimensional movement of the cursor 401 on the display screen 340.

A mouse 310 typically has one or more finger actuated control buttons (i.e. mouse buttons). While the mouse buttons can be used for different functions such as selecting a menu option pointed at by the cursor 401, the disclosed invention may use a single mouse button to "select" a lens 410 and to trace the movement of the cursor 401 along a desired path. Specifically, to select a lens 410, the cursor 401 is first located within the extent of the lens 410. In other words, the cursor 401 is "pointed" at the lens 410. Next, the mouse button is depressed and released. That is, the mouse button is "clicked". Selection is thus a point and click operation. To trace the movement of the cursor 401, the cursor 401 is located at the desired starting location, the mouse button is depressed to signal the computer 320 to activate a lens control element, and the mouse 310 is moved while maintaining the button depressed. After the desired path has been traced, the mouse button is released. This procedure is often referred to as "clicking" and "dragging" (i.e. a click and drag operation). It will be understood that a predetermined key on a keyboard 310 could also be used to activate a mouse click or drag. In the following, the term "clicking" will refer to the depression of a mouse button indicating a selection by the user and the term "dragging" will refer to the subsequent motion of the mouse 310 and cursor 401 without the release of the mouse button.

The GUI 400 may include the following lens control elements: move, pickup, resize base, resize focus, fold, magnify, zoom, and scoop. Each of these lens control elements has at least one lens control icon or alternate cursor icon associated with it. In general, when a lens 410 is selected by a user through a point and click operation, the following lens control icons may be displayed over the lens 410: pickup icon 450, base outline icon 412, base bounding rectangle icon 411, focal region bounding rectangle icon 421, handle icons 481, 482, 491 magnify slide bar icon 440, zoom icon 495, and scoop slide bar icon 540 (see FIG. 5). Typically, these icons are displayed simultaneously after selection of the lens 410. In addition, when the cursor 401 is located within the extent of a selected lens 410, an alternate cursor icon 460, 470, 480, 490, 495 may be displayed over the lens 410 to replace the cursor 401 or may be displayed in combination with the cursor 401. These lens control elements, corresponding icons, and their effects on the characteristics of a lens 410 are described below with reference to FIGS. 4 and 5.

In general, when a lens 410 is selected by a point and click operation, bounding rectangle icons 411, 421 are displayed surrounding the base 412 and focal region 420 of the selected lens 410 to indicate that the lens 410 has been selected. With respect to the bounding rectangles 411, 421 one might view them as glass windows enclosing the lens base 412 and focal region 420, respectively. The bounding rectangles 411, 421 include handle icons 481, 482, 491 allowing for direct manipulation of the enclosed base 412 and focal region 420 as will be explained below. Thus, the bounding rectangles 411, 421 not only inform the user that the lens 410 has been selected, but also provide the user with indications as to what manipulation operations might be possible for the selected lens 410 though use of the displayed handles 481, 482, 491. Note that it is well within the scope of the present invention to provide a bounding region having a shape other than generally rectangular. Such a bounding region could be of any of a great number of shapes including oblong, oval, ovoid, conical, cubic, cylindrical, polyhedral, spherical, etc.

Moreover, the cursor 401 provides a visual cue indicating the nature of an available lens control element. As such, the cursor 401 will generally change in form by simply pointing to a different lens control icon 450, 412, 411, 421, 481, 482, 491, 440, 540. For example, when resizing the base 412 of a lens 410 using a corner handle 491, the cursor 401 will change form to a resize icon 490 once it is pointed at (i.e. positioned over) the corner handle 491. The cursor 401 will remain in the form of the resize icon 490 until the cursor 401 has been moved away from the corner handle 491.

Lateral movement of a lens 410 is provided by the move lens control element of the GUI 400. This functionality is accomplished by the user first selecting the lens 410 through a point and click operation. Then, the user points to a point within the lens 410 that is other than a point lying on a lens control icon 450, 412, 411, 421, 481, 482, 491, 440, 540. When the cursor 401 is so located, a move icon 460 is displayed over the lens 410 to replace the cursor 401 or may be displayed in combination with the cursor 401. The move icon 460 not only informs the user that the lens 410 may be moved, but also provides the user with indications as to what movement operations are possible for the selected lens 410. For example, the move icon 460 may include arrowheads indicating up, down, left, and right motion. Next, the lens 410 is moved by a click and drag operation in which the user clicks and drags the lens 410 to the desired position on the screen 340 and then releases the mouse button 310. The lens 410 is locked in its new position until a further pickup and move operation is performed.

Lateral movement of a lens 410 is also provided by the pickup lens control element of the GUI. This functionality is accomplished by the user first selecting the lens 410 through a point and click operation. As mentioned above, when the lens 410 is selected a pickup icon 450 is displayed over the lens 410 near the centre of the lens 410. Typically, the pickup icon 450 will be a crosshairs. In addition, a base outline 412 is displayed over the lens 410 representing the base 412 of the lens 410. The crosshairs 450 and lens outline 412 not only inform the user that the lens has been selected, but also provides the user with an indication as to the pickup operation that is possible for the selected lens 410. Next, the user points at the crosshairs 450 with the cursor 401. Then, the lens outline 412 is moved by a click and drag operation in which the user clicks and drags the crosshairs 450 to the desired position on the screen 340 and then releases the mouse button 310. The full lens 410 is then moved to the new position and is locked there until a further pickup operation is performed. In contrast to the move operation described above, with the pickup operation, it is the outline 412 of the lens 410 that the user repositions rather than the full lens 410.

Resizing of the base 412 (or outline) of a lens 410 is provided by the resize base lens control element of the GUI. After the lens 410 is selected, a bounding rectangle icon 411 is displayed surrounding the base 412. For a rectangular shaped base 412, the bounding rectangle icon 411 may be coextensive with the perimeter of the base 412. The bounding rectangle 411 includes handles 491. These handles 491 can be used to stretch the base 412 taller or shorter, wider or narrower, or proportionally larger or smaller. The corner handles 491 will keep the proportions the same while changing the size. The middle handles (not shown) will make the base 412 taller or shorter, wider or narrower. Resizing the base 412 by the corner handles 491 will keep the base 412 in proportion. Resizing the base 412 by the middle handles will change the proportions of the base 412. That is, the middle handles change the aspect ratio of the base 412 (i.e. the ratio between the height and the width of the bounding rectangle 411 of the base 412). When a user points at a handle 491 with the cursor 401 a resize icon 490 may be displayed over the handle 491 to replace the cursor 401 or may be displayed in combination with the cursor 401. The resize icon 490 not only informs the user that the handle 491 may be selected, but also provides the user with indications as to the resizing operations that are possible with the selected handle. For example, the resize icon 490 for a corner handle 491 may include arrows indicating proportional resizing. The resize icon (not shown) for a middle handle may include arrows indicating width resizing or height resizing. After pointing at the desired handle 491 the user would click and drag the handle 491 until the desired shape and size for the base 412 is reached. Once the desired shape and size are reached, the user would release the mouse button 310. The base 412 of the lens 410 is then locked in its new size and shape until a further base resize operation is performed.

Resizing of the focal region 420 of a lens 410 is provided by the resize focus lens control element of the GUI. After the lens 410 is selected, a bounding rectangle icon 421 is displayed surrounding the focal region 420. For a rectangular shaped focal region 420, the bounding rectangle icon 421 may be coextensive with the perimeter of the focal region 420. The bounding rectangle 421 includes handles 481, 482. These handles 481, 482 can be used to stretch the focal region 420 taller or shorter, wider or narrower, or proportionally larger or smaller. The corner handles 481 will keep the proportions the same while changing the size. The middle handles 482 will make the focal region 420 taller or shorter, wider or narrower. Resizing the focal region 420 by the corner handles 481 will keep the focal region 420 in proportion. Resizing the focal region 420 by the middle handles 482 will change the proportions of the focal region 420. That is, the middle handles 482 change the aspect ratio of the focal region 420 (i.e. the ratio between the height and the width of the bounding rectangle 421 of the focal region 420). When a user points at a handle 481, 482 with the cursor 401 a resize icon 480 may be displayed over the handle 481, 482 to replace the cursor 401 or may be displayed in combination with the cursor 401. The resize icon 480 not only informs the user that a handle 481, 482 may be selected, but also provides the user with indications as to the resizing operations that are possible with the selected handle. For example, the resize icon 480 for a corner handle 481 may include arrows indicating proportional resizing. The resize icon 480 for a middle handle 482 may include arrows indicating width resizing or height resizing. After pointing at the desired handle 481, 482, the user would click and drag the handle 481, 482 until the desired shape and size for the focal region 420 is reached. Once the desired shape and size are reached, the user would release the mouse button 310. The focal region 420 is then locked in its new size and shape until a further focus resize operation is performed.

Folding of the focal region 420 of a lens 410 is provided by the fold control element of the GUI. In general, control of the degree and direction of folding (i.e. skewing of the viewer aligned vector 231 as described by Carpendale) is accomplished by a click and drag operation on a point 471, other than a handle 481, 482, on the bounding rectangle 421 surrounding the focal region 420. The direction of folding is determined by the direction in which the point 471 is dragged. The degree of folding is determined by the magnitude of the translation of the cursor 401 during the drag. In general, the direction and degree of folding corresponds to the relative displacement of the focus 420 with respect to the lens base 410. In other words, and referring to FIG. 2, the direction and degree of folding corresponds to the displacement of the point FP 233 relative to the point FPo 232, where the vector joining the points FPo 232 and FP 233 defines the viewer aligned vector 231. In particular, after the lens 410 is selected, a bounding rectangle icon 421 is displayed surrounding the focal region 420. The bounding rectangle 421 includes handles 481, 482. When a user points at a point 471, other than a handle 481, 482, on the bounding rectangle 421 surrounding the focal region 420 with the cursor 401, a fold icon 470 may be displayed over the point 471 to replace the cursor 401 or may be displayed in combination with the cursor 401. The fold icon 470 not only informs the user that a point 471 on the bounding rectangle 421 may be selected, but also provides the user with indications as to what fold operations are possible. For example, the fold icon 470 may include arrowheads indicating up, down, left, and right motion. By choosing a point 471, other than a handle 481, 482, on the bounding rectangle 421 a user may control the degree and direction of folding. To control the direction of folding, the user would click on the point 471 and drag in the desired direction of folding. To control the degree of folding, the user would drag to a greater or lesser degree in the desired direction of folding. Once the desired direction and degree of folding is reached, the user would release the mouse button 310. The lens 410 is then locked with the selected fold until a further fold operation is performed.

Magnification of the lens 410 is provided by the magnify lens control element of the GUI. After the lens 410 is selected, the magnify control is presented to the user as a slide bar icon 440 near or adjacent to the lens 410 and typically to one side of the lens 410. Sliding the bar 441 of the slide-bar 440 results in a proportional change in the magnification of the lens 410. The slide bar 440 not only informs the user that magnification of the lens 410 may be selected, but also provides the user with an indication as to what level of magnification is possible. The slide bar 440 includes a bar 441 that may be slid up and down, or left and right, to adjust and indicate the level of magnification. To control the level of magnification, the user would click on the bar 441 of the slide bar 440 and drag in the direction of desired magnification level. Once the desired level of magnification is reached, the user would release the mouse button 310. The lens 410 is then locked with the selected magnification until a further magnification operation is performed. In general, the focal region 420 is an area of the lens 410 having constant magnification (i.e. if the focal region is a plane). Again referring to FIGS. 1 and 2, magnification of the focal region 420, 233 varies inversely with the distance from the focal region 420, 233 to the reference view plane (RVP) 201. Magnification of areas lying in the shoulder region 430 of the lens 410 also varies inversely with their distance from the RVP 201. Thus, magnification of areas lying in the shoulder region 430 will range from unity at the base 412 to the level of magnification of the focal region 420.

Zoom functionality is provided by the zoom lens control element of the GUI. Referring to FIG. 2, the zoom lens control element, for example, allows a user to quickly navigate to a region of interest 233 within a continuous view of a larger presentation 210 and then zoom in to that region of interest 233 for detailed viewing or editing. Referring to FIG. 4, the combined presentation area covered by the focal region 420 and shoulder region 430 and surrounded by the base 412 may be referred to as the "extent of the lens". Similarly, the presentation area covered by the focal region 420 may be referred to as the "extent of the focal region". The extent of the lens may be indicated to a user by a base bounding rectangle 411 when the lens 410 is selected. The extent of the lens may also be indicated by an arbitrarily shaped figure that bounds or is coincident with the perimeter of the base 412. Similarly, the extent of the focal region may be indicated by a second bounding rectangle 421 or arbitrarily shaped figure. The zoom lens control element allows a user to: (a) "zoom in" to the extent of the focal region such that the extent of the focal region fills the display screen 340 (i.e. "zoom to focal region extent"); (b) "zoom in" to the extent of the lens such that the extent of the lens fills the display screen 340 (i.e. "zoom to lens extent"); or, (c) "zoom in" to the area lying outside of the extent of the focal region such that the area without the focal region is magnified to the same level as the extent of the focal region (i.e. "zoom to scale").

In particular, after the lens 410 is selected, a bounding rectangle icon 411 is displayed surrounding the base 412 and a bounding rectangle icon 421 is displayed surrounding the focal region 420. Zoom functionality is accomplished by the user first selecting the zoom icon 495 through a point and click operation When a user selects zoom functionality, a zoom cursor icon 496 may be displayed to replace the cursor 401 or may be displayed in combination with the cursor 401. The zoom cursor icon 496 provides the user with indications as to what zoom operations are possible. For example, the zoom cursor icon 496 may include a magnifying glass. By choosing a point within the extent of the focal region, within the extent of the lens, or without the extent of the lens, the user may control the zoom function. To zoom in to the extent of the focal region such that the extent of the focal region fills the display screen 340 (i.e. "zoom to focal region extent"), the user would point and click within the extent of the focal region. To zoom in to the extent of the lens such that the extent of the lens fills the display screen 340 (i.e. "zoom to lens extent"), the user would point and click within the extent of the lens. Or, to zoom in to the presentation area without the extent of the focal region, such that the area without the extent of the focal region is magnified to the same level as the extent of the focal region (i.e. "zoom to scale"), the user would point and click without the extent of the lens. After the point and click operation is complete, the presentation is locked with the selected zoom until a further zoom operation is performed.

Alternatively, rather than choosing a point within the extent of the focal region, within the extent of the lens, or without the extent of the lens to select the zoom function, a zoom function menu with multiple items (not shown) or multiple zoom function icons (not shown) may be used for zoom function selection. The zoom function menu may be presented as a pull-down menu. The zoom function icons may be presented in a toolbar or adjacent to the lens 410 when the lens is selected. Individual zoom function menu items or zoom function icons may be provided for each of the "zoom to focal region extent", "zoom to lens extent", and "zoom to scale" functions described above. In this alternative, after the lens 410 is selected, a bounding rectangle icon 411 may be displayed surrounding the base 412 and a bounding rectangle icon 421 may be displayed surrounding the focal region 420. Zoom functionality is accomplished by the user selecting a zoom function from the zoom function menu or via the zoom function icons using a point and click operation. In this way, a zoom function may be selected without considering the position of the cursor 401 within the lens 410.

The concavity or "scoop" of the shoulder region 430 of the lens 410 is provided by the scoop lens control element of the GUI. After the lens 410 is selected, the scoop control is presented to the user as a slide bar icon 540 (see FIG. 5) near or adjacent to the lens 410 and typically below the lens 410. Sliding the bar (not shown) of the slide bar 540 results in a proportional change in the concavity or scoop of the shoulder region 430 of the lens 410. The slide bar 540 not only informs the user that the shape of the shoulder region 430 of the lens 410 may be selected, but also provides the user with an indication as to what degree of shaping is possible. The slide bar 540 includes a bar (not shown) that may be slid left and right, or up and down, to adjust and indicate the degree of scooping. To control the degree of scooping, the user would click on the bar of the slide bar 540 and drag in the direction of desired scooping degree. Once the desired degree of scooping is reached, the user would release the mouse button 310. The lens 410 is then locked with the selected scoop until a further scooping operation is performed.

Figure 5:
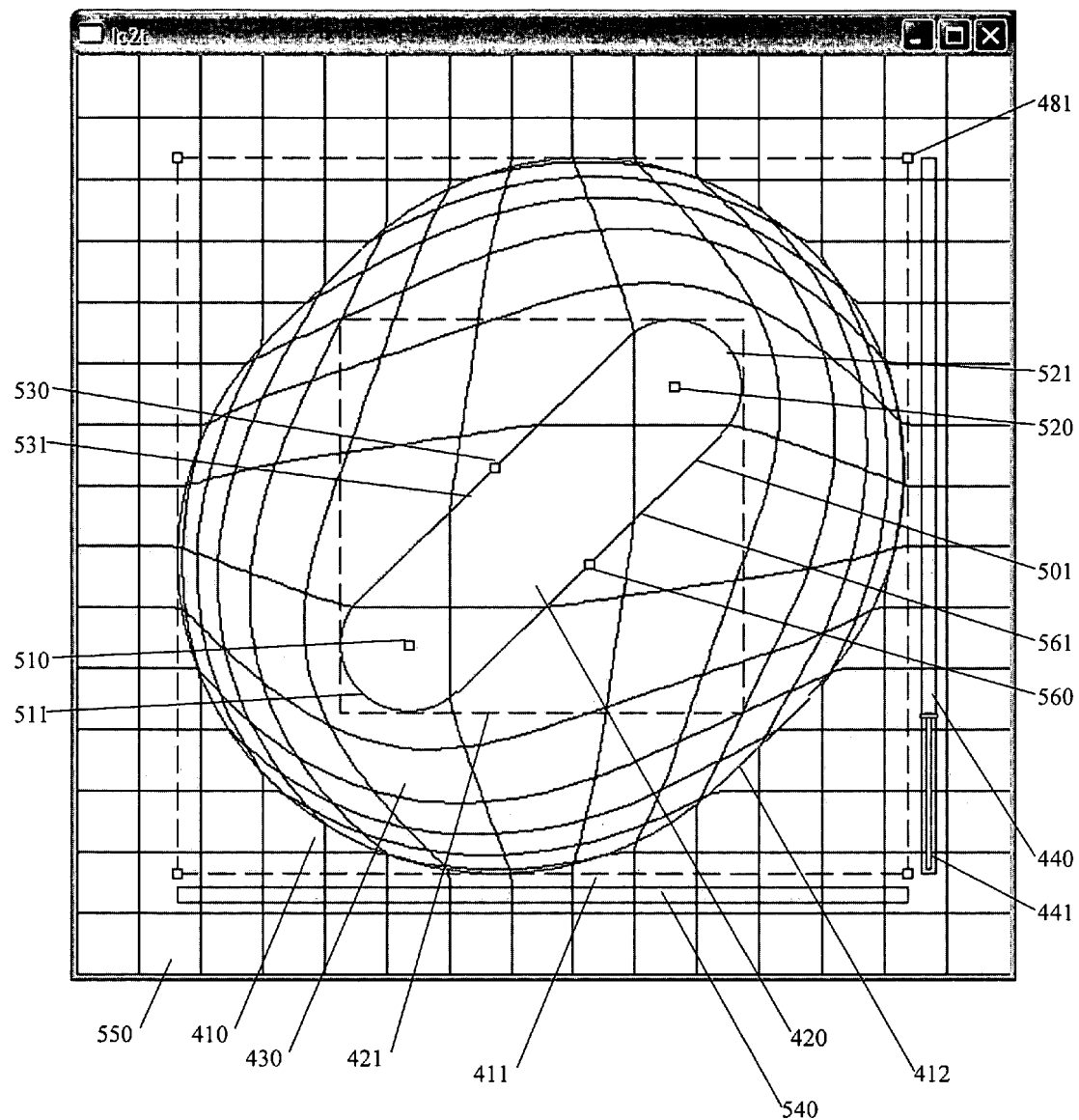
FIG. 5 is a partial screen capture illustrating a GUI and lens in which the lens has a focal region based on a line segment source in accordance with an embodiment of the invention.

Advantageously, a user may choose to hide one or more lens control icons 450, 412, 411, 421, 481, 482, 491, 440, 495, 540 shown in FIGS. 4 and 5 from view so as not to impede the user's view of the image within the lens 410. This may be helpful, for example, during an editing or move operation. A user may select this option through means such as a menu, toolbar, or lens property dialog box.

In addition, the GUI 400 maintains a record of control element operations such that the user may restore pre-operation presentations. This record of operations may be accessed by or presented to the user through "Undo" and "Redo" icons 497, 498, through a pull-down operation history menu (not shown), or through a toolbar.

Thus, detail-in-context data viewing techniques allow a user to view multiple levels of detail or resolution on one display 340. The appearance of the data display or presentation is that of one or more virtual lenses showing detail 233 within the context of a larger area view 210. Using multiple lenses in detail-in-context data presentations may be used to compare two regions of interest at the same time. Folding enhances this comparison by allowing the user to pull the regions of interest closer together. Moreover, using detail-in-context technology such as PDT, an area of interest can be magnified to pixel level resolution, or to any level of detail available from the source information, for in-depth review. The digital images may include graphic images, maps, photographic images, or text documents, and the source information may be in raster, vector, or text form.

For example, in order to view a selected object or area in detail, a user can define a lens 410 over the object using the GUI 400. The lens 410 may be introduced to the original image to form the a presentation through the use of a pull-down menu selection, tool bar icon, etc. Using lens control elements for the GUI 400, such as move, pickup, resize base, resize focus, fold, magnify, zoom, and scoop, as described above, the user adjusts the lens 410 for detailed viewing of the object or area. Using the magnify lens control element, for example, the user may magnify the focal region 420 of the lens 410 to pixel quality resolution revealing detailed information pertaining to the selected object or area. That is, a base image (i.e., the image outside the extent of the lens) is displayed at a low resolution while a lens image (i.e., the image within the extent of the lens) is displayed at a resolution based on a user selected magnification 440, 441.

In operation, the data processing system 300 employs EPS techniques with an input device 310 and GUI 400 for selecting objects or areas for detailed display to a user on a display screen 340. Data representing an original image or representation is received by the CPU 320 of the data processing system 300. Using EPS techniques, the CPU 320 processes the data in accordance with instructions received from the user via an input device 310 and GUI 400 to produce a detail-in-context presentation. The presentation is presented to the user on a display screen 340. It will be understood that the CPU 320 may apply a transformation to the shoulder region 430 surrounding the region-of-interest 420 to affect blending or folding in accordance with EPS technology. For example, the transformation may map the region-of-interest 420 and/or shoulder region 430 to a predefined lens surface, defined by a transformation or distortion function and having a variety of shapes, using EPS techniques. Or, the lens 410 may be simply coextensive with the region-of-interest 420.

The lens control elements of the GUI 400 are adjusted by the user via an input device 310 to control the characteristics of the lens 410 in the detail-in-context presentation. Using an input device 310 such as a mouse, a user adjusts parameters of the lens 410 using icons and scroll bars of the GUI 400 that are displayed over the lens 410 on the display screen 340. The user may also adjust parameters of the image of the full scene. Signals representing input device 310 movements and selections are transmitted to the CPU 320 of the data processing system 300 where they are translated into instructions for lens control.

Moreover, the lens 410 may be added to the presentation before or after the object or area is selected. That is, the user may first add a lens 410 to a presentation or the user may move a pre-existing lens into place over the selected object or area. The lens 410 may be introduced to the original image to form the presentation through the use of a pull-down menu selection, tool bar icon, etc.

Advantageously, by using a detail-in-context lens 410 to select an object or area for detailed information gathering, a user can view a large area (i.e., outside the extent of the lens 410) while focusing in on a smaller area (or within the focal region 420 of the lens 410) surrounding the selected object. This makes it possible for a user to accurately gather detailed information without losing visibility or context of the portion of the original image surrounding the selected object.

Now, according to the present invention, improved GUIs are provided for manipulating fisheye lenses and associated representation data while reducing occlusion.

Frequently, data presented in geographic information systems and images collected in remote sensing systems contains extended data features such as roads, railways, and streams which are not necessarily aligned with either major direction of a presentation axis pair (e.g., the x, y axis; the North, East cartographic axis; etc.). As described above, fisheye lenses 410 with adjustable shapes and sizes provide a useful means of presenting the details of such data features within the context of the surrounding data. However, there is a need for an improved GUI for use with representations having features that do not align with common axis systems. The present invention provides such a GUI and addresses issues of data occlusion that can arise in certain instances. In particular, the present invention provides additional GUI elements and methods that can be used for manipulating the parameters of fisheye lenses 410. The present invention is well suited to lenses 410 for which the defining shape of the focal region 420 can be represented by one line segment for simple lens shapes, or by two or more adjoined line segments in the case of complex lens focal region shapes.

Figure 6:
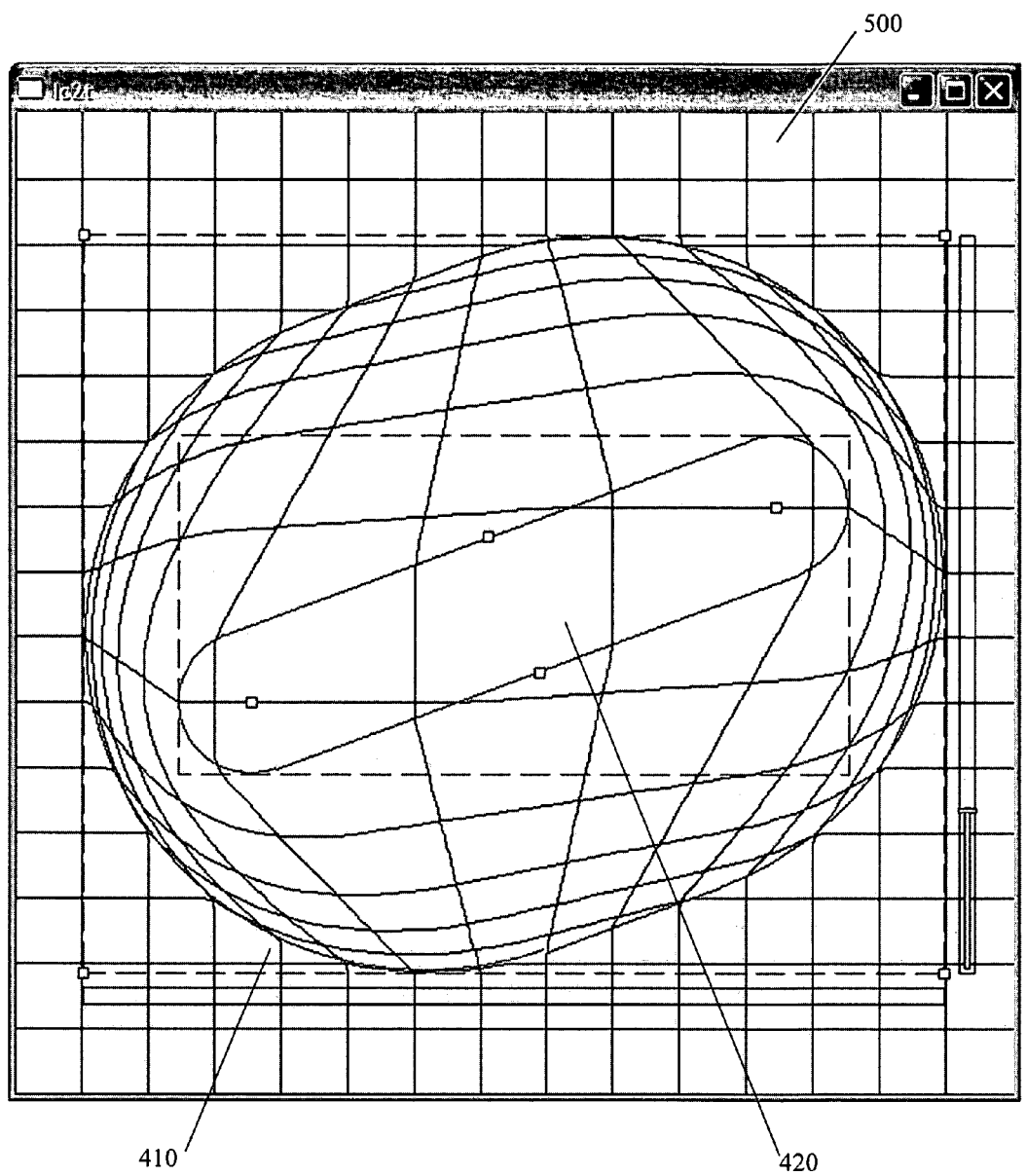
FIG. 6 is a partial screen capture illustrating the GUI and lens of FIG. 5 in which the focal region of the lens is rotated and extended in length in accordance with an embodiment of the invention.
Figure 7:
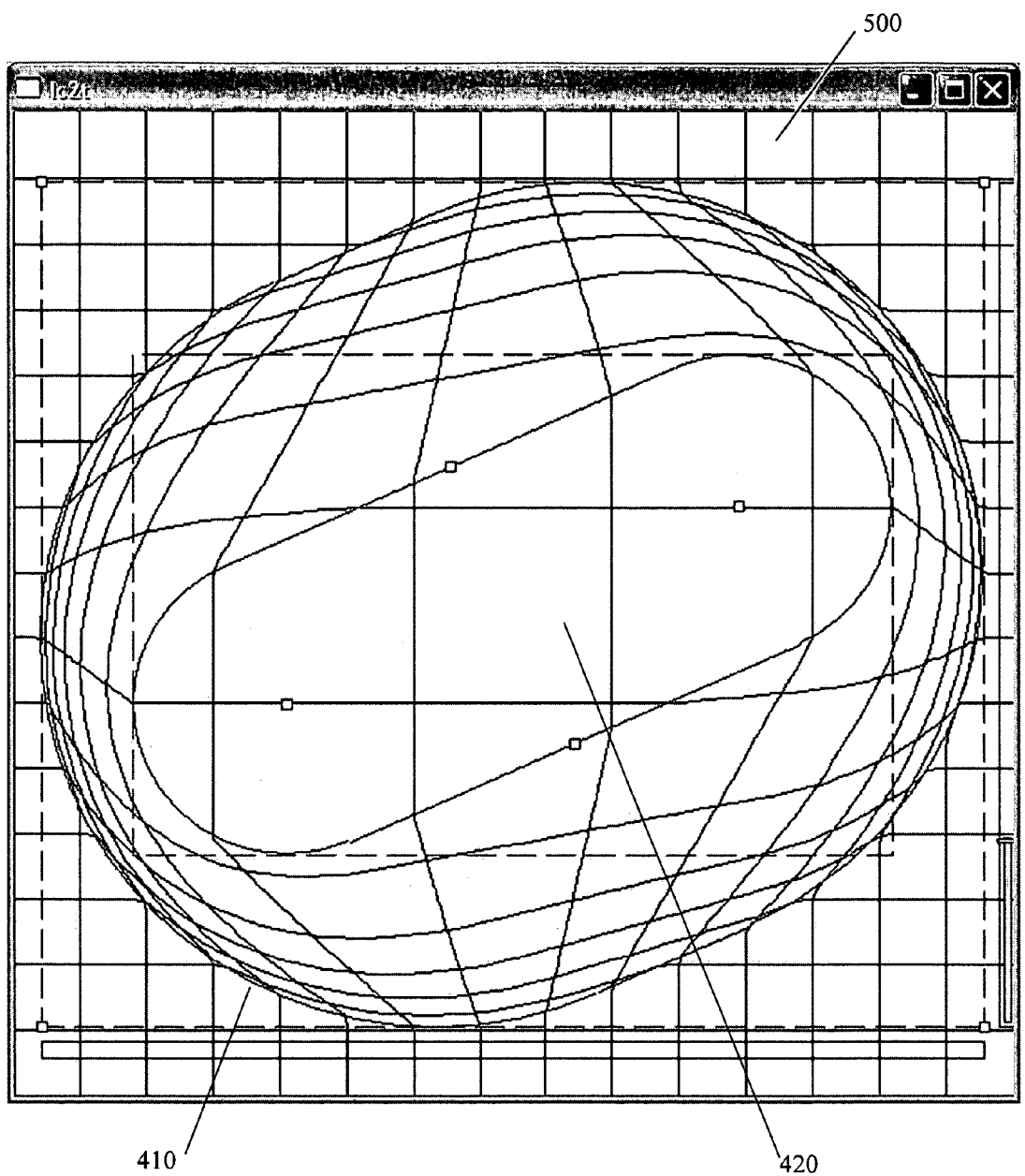
FIG. 7 is a partial screen capture illustrating the GUI and lens of FIG. 6 in which the focal region of the lens is extended in width in accordance with an embodiment of the invention.

The invention is shown schematically in FIGS. 5 through 7, in which a lens 410 with a line segment focus 420 is represented, as applied to a regular grid 550. In particular, FIG. 5 is a partial screen capture illustrating a GUI 500 and lens 410 in which the lens 410 has a focal region 420 based on a line segment source 510, 520 (i.e., a line segment focus 420) in accordance with an embodiment of the invention. FIG. 6 is a partial screen capture illustrating the GUI 500 and lens 410 of FIG. 5 in which the focal region 420 of the lens 410 is rotated and extended in length in accordance with an embodiment of the invention. And, FIG. 7 is a partial screen capture illustrating the GUI 500 and lens 410 of FIG. 6 in which the focal region 420 of the lens 410 is extended in width in accordance with an embodiment of the invention.

In FIGS. 5-7, the points representing the perimeter 501 of the focal region 420 are equidistant, that is, at a distance r, from a central line segment 510, 520 which will be referred to as the "source line segment". The area of the focal region 420 has uniform magnification. The perimeter 501 of the focal region 420 can be represented by two parallel line segments 531, 541 joined by semicircles 511, 521 at opposite ends as shown in FIG. 5. In other words, the focal region 420 has an oblong shape. Of course the focal region 420 could also have a rectangular, oval, or other such shape. The focal region 420 is provided with four handle icons 510, 520, 530, 540 for adjusting the size and shape of the focal region 420. A handle icon 510, 520 is located at each end of the source line segment. In addition, a handle icon 530, 560 is located on each parallel line segment 531, 561 of the perimeter 501.

According to the present invention, a user may use a standard input device such as a mouse or other pointing device 310, and, beginning with a "click" or other indication to commence a dragging operation, drag an end 510, 520 of the source line segment to a new location. In one embodiment of the present invention, dragging one of the source line segment handles (e.g., 510) in a direction collinear with the source line segment causes a change in the length of the focal region 420, independent of the location of the other line segment end (e.g., 520). Translation of one line segment end (e.g., 510) relative to the other end (e.g., 520) can also be used to effect a rotation of the source line segment and hence the focal region 420. In this manner, using translation of the endpoints 510, 520 as needed, the focal region 420 can be extended to encompass, for example, the two endpoints of a distance measurement to display the endpoints clearly at high magnification. In addition, a focal region 420 extended in this manner can be used to magnify the entire path between points of interest in order to better display objects or entities in the direct line of sight between the points of interest. These embodiment are shown in FIGS. 5 and 6 where FIG. 5 shows the original focal region position and FIG. 6 shows the adjusted focal region position (i.e., lengthened and rotated).

For the purpose of adjusting the focal region width, additional handles 530, 560 may be provided on the sides 531, 561 of the focal region perimeter 501. Click and drag operations on these handles 530, 560 cause an expansion of the focal region in a direction normal to the source line segment (i.e., an increase in width). FIG. 7 shows a lens 410 with increased focal region width as compared to the lens 410 shown in FIG. 6.

According to another embodiment of the invention, the movement of the two source line segment end handles 510, 520 is coupled, such that movement of one end (e.g., 510) causes a corresponding movement of the other line segment end (e.g., 520) in an opposite direction.

According to another embodiment of the invention, the source line segment length is held constant, and the motion of the lens handles 510, 520 is constrained to effect only rotation of the line segment about a central point (e.g., midway between points 510, 520) without changing the length of the line segment.

According to another embodiment of the invention, a compound focal region shape may be created by adjoining multiple source line segments. With such a complex focal region, handles 510, 520 can be provided at each line segment end for the purpose of generating a lens 410 to approximately cover an extended feature in a representation, for example a river with multiple bends or a path on a map.

According to another embodiment of the invention, a line segment lens or compound focal region lens 410 may be automatically constrained to fit a feature in a representation such as a river based on foreknowledge of the shape, size, and other parameters of the feature, or based on computed recognition (e.g., pattern recognition) of the parameters of the feature, without the need for the user to adjust the lens parameters using the GUI 500.

According to another embodiment of the invention, a lens 410 may be traversed along a path defined by a data feature in a representation such as a river or valley, through the adjustment of a slider control (e.g., one similar to 440 or 540) or other GUI element positioned on the lens or as a nearby GUI element. In this case, the line segment focus or compound focus would be re-oriented to be parallel with the portion of the data feature of interest.

Figure 8:
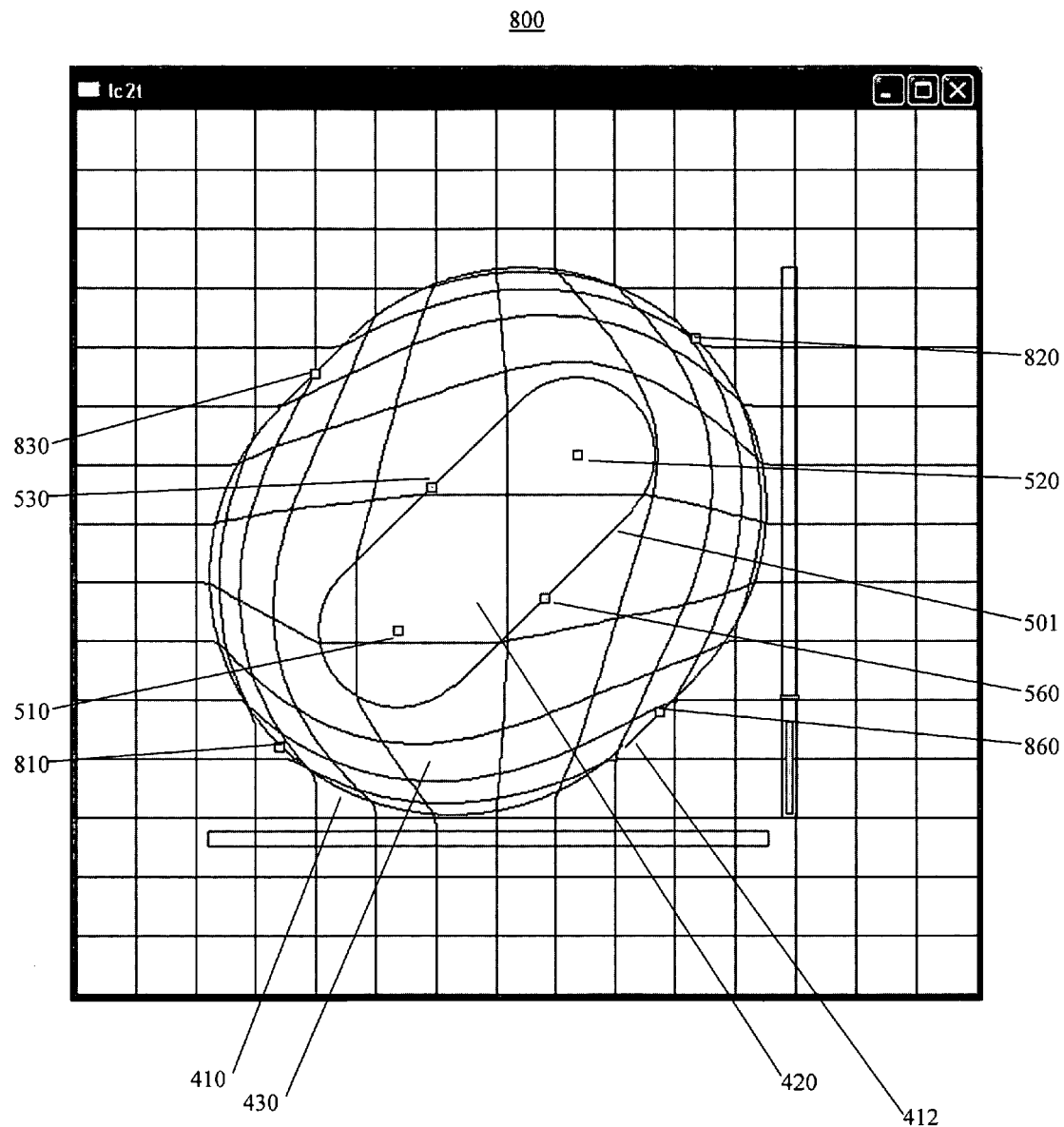
FIG. 8 is a partial screen capture illustrating an alternate GUI and lens in which the lens has a focal region based on a line segment source in accordance with an embodiment of the invention; and, FIG. 9 is a flow chart illustrating operations of software modules within the memory of the data processing system for generating a presentation of a region-of-interest in an original image for display on a display screen in accordance with an embodiment of the invention.

FIG. 8 is a partial screen capture illustrating an alternate GUI 800 and lens 410 in which the lens 410 has a focal region 420 based on a line segment source 510, 520 in accordance with an embodiment of the invention. The GUI 800 of FIG. 8 includes four handles 810, 820, 830, 860 on the bounds 412 of the lens 410. When a user clicks and drags on one of these handles 810, 820, 830, 860, the bounds 412 of the lens 410 expands or contracts accordingly. That is, the width sw of the shoulder region 430 is adjusted. All four handles 810, 820, 830, 860 perform the same function, and clicking and dragging on any one handle (e.g., 810) will cause all four handles 810, 820, 830, 860 to be repositioned.

Now, a particular problem with fisheye lenses 410 is the possibility that information in the shoulder region 430 may be occluded by information in the focal region 420. Occlusion typically occurs at high magnification or in areas of the presentation where the focal region bounds 501 approaches the lens extent 412. To avoid such occlusion, when a GUI 500 is used to resize either the focal region 420 or the shoulder region 430 (i.e., the lens drop-off width), the user has to be constrained from making lens adjustments that will result in occlusion, or the lens extent 412 has to be adjusted to a minimum size for which no occlusion will occur. The GUI 500 can be coupled to a dynamic width adjustment method such as that described in U.S. patent application Ser. No. 11/041,920, which is incorporated herein by reference, such that the lens extent 412 expands automatically to prevent occlusion as the source line segment points 510, 520 are repositioned. However one still needs to ensure that the GUI 500 is able to restrict the focus and lens parameters to ensure that occlusion cannot occur. A method for achieving this result is described in the following in the context of a lens 410 having a line segment focus 420.

First, define the identified variables as follows:
dl is the distance an interaction point is from the source line segment 510, 520;
len is the length of the source line segment 510, 520;
m is the magnification of the lens 410;
r is the distance from the source line segment 510, 520 to the focal perimeter 501 as described above (i.e., the focal radius); and,
sw is the width of the shoulder 430 of the lens 410.

The interaction point is a point near the bounds 412 of the lens 410. dl is measured from the interaction point to a nearest point on the source line segment 510, 520 (as it exists undisplaced). sw is the width of the shoulder 430 of the lens 410. In other words, SW is the distance from the edge 501 of the focal region 420 to the edge 412 of the lens 410. r is the width (or radius) of the focus 420. It determines the area surrounding the source line segment 510, 520, or other primitive, which has constant magnification at the level set by the lens. It thus determines the focal region 420 of the lens 410. For example, for a square focus the primitive would be a point and the focal radius r would be measured axially from that point. This would result in a square around that point which receives constant maximum magnification. In this example, the shoulder width sw would scribe a rounded rectangle as all the points that are exactly sw units are measured outward from the square.

Now, consider the following three cases.

Case 1: A user resizes the focal radius r (e.g., by adjusting a side handle 530, 540). In this case, a maximum radius maxr has to be computed so that the magnified bounds 501 of the focal region 420 does not expand past the bounds 412 of the lens 410 which would cause occlusion of data. The maximum radius maxr may be computed as follows:

$$\max r = sw/(m-1) - dl$$

In the above, maxr is infinity for m=1.

Case 2: The user resizes the shoulder width (e.g., by adjusting a handle 481). In this case, a minimum shoulder width minw has to be computed so that the bounds of the lens 412 does not shrink to a point at which it is smaller than the perimeter 501 of the magnified focal region 420 which would cause occlusion of data. The minimum shoulder width minw may be computed as follows:

$$\min w = (\text{len} + r)^*(m-1)$$

In the above, minw=0 for m=1.

Case 3: The user repositions the source line segment end points 510, 520. In this case, a maximum line length maxd has to be computed so that the magnified bounds 501 of the focal region 420 does not expand past the bounds 412 of the lens 410 which would cause occlusion of data. The maximum line length maxd may be computed as follows:

$$\max d = sw/(m-1) - r, \text{ for } m > 1$$

$$\max d = r + sw + \text{len}, \text{ for } m \leq 1$$

The lens extent 412 can then be adjusted to satisfy the constraints on maxr, minw, or maxd as computed for the cases above, so that no occlusion of data in the presentation results from the application of the lens 410 to the representation. That is, to reduce occlusion of the shoulder region by the focal region, adjustment of the radius r is restricted to below the maximum radius maxr, adjustment of the width sw of the shoulder region is restricted to above the minimum shoulder width minw, and/or adjustment of the length len of the line segment is restricted to below the maximum line segment length maxd.

Figure 9:
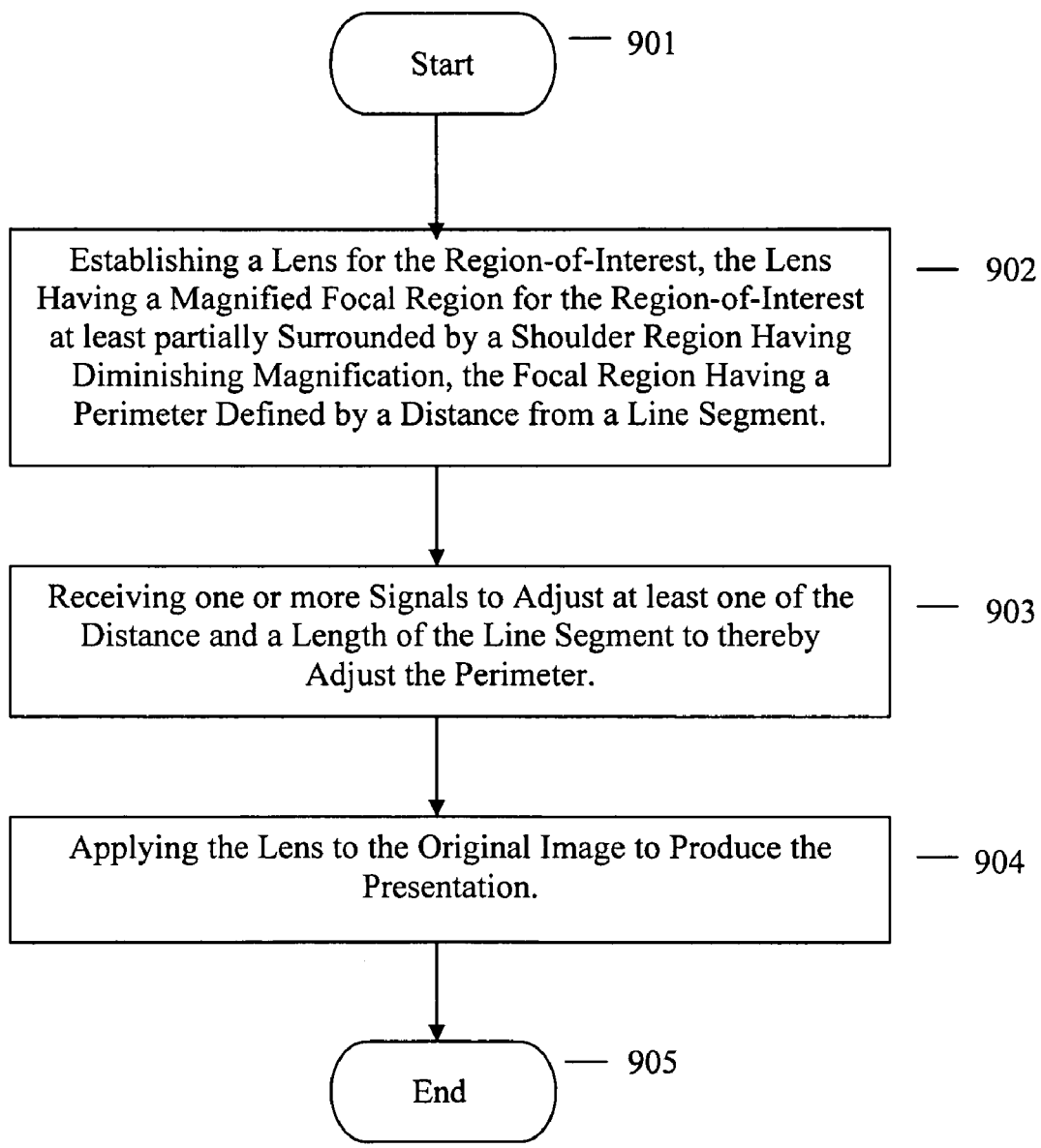

The above described method (i.e., with respect to FIGS. 5-8) may be summarized with the aid of a flowchart. FIG. 9 is a flow chart illustrating operations 900 of software modules 331 within the memory 330 of the data processing system 300 for generating a presentation of a region-of-interest in an original image for display on a display screen in accordance with an embodiment of the invention.

At step 901, the operations 900 start.

At step 902, a lens 410 for the region-of-interest is established, the lens 410 having a magnified focal region 420 for the region-of-interest at least partially surrounded by a shoulder region 430 having diminishing magnification, the focal region 420 having a perimeter 501 defined by a radius r from a line segment 510, 520.

At step 903, one or more signals are received to adjust at least one of the radius r and a length len of the line segment 510, 520 to thereby adjust the perimeter 501.

At step 904, the lens 410 is applied to the original image to produce the presentation.

At step 905, the operations 900 end.

Preferably, the step of receiving further includes receiving one or more signals to adjust a position of an end (e.g., 510 or 520) of the line segment 510, 520 to thereby rotate the focal region 420. Preferably, the step of applying further includes displacing the original image onto the lens 410 to produce a displacement and perspectively projecting the displacement onto a plane 201 in a direction 231 aligned with a viewpoint 240 for the region-of-interest. Preferably, the method further includes displaying the presentation on the display screen 340. Preferably, the lens is a surface. Preferably, the method further includes receiving the one or more signals through a GUI 500 displayed over the lens 410. Preferably, the GUI 500 has means for adjusting at least one of the radius r, the length len, and the position. Preferably, at least some of the means are icons. Preferably, the means for adjusting the length len and the position is a handle icon 510, 520 positioned at an end of the line segment 510, 520. Preferably, the means for adjusting the radius r is a handle icon 530, 560 positioned on a side 531, 561 of the perimeter 501. Preferably, the method further includes receiving the one or more signals from a pointing device 310 manipulated by a user. Preferably, the pointing device 310 is at least one of a mouse, a pen and tablet, a trackball, a keyboard, an eye tracking device, and a position tracking device. Preferably, an adjustment to a first end (e.g., 510) of the line segment 510, 520 causes a corresponding adjustment to a second end (e.g., 520) of the line segment 510, 520. Preferably, the line segment 510, 520 and focal region 420 rotate about a center point of the line segment 510, 520. Preferably, method further includes receiving one or more signals through a GUI 800 displayed over the lens 410 to adjust a width sw of the shoulder region 430, wherein the GUI 800 has one or more handle icons 810, 820, 830, 860 positioned on a bounds 412 of the lens 410 for adjusting the width sw.

While this invention is primarily discussed as a method, a person of ordinary skill in the art will understand that the apparatus discussed above with reference to a data processing system 300, may be programmed to enable the practice of the method of the invention. Moreover, an article of manufacture for use with a data processing system 300, such as a pre-recorded storage device or other similar computer readable medium including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the data processing system 300 of FIG. 3 can be contained in a data carrier product according to one embodiment of the invention. This data carrier product can be loaded into and run by the data processing system 300 of FIG. 3. In addition, the sequences of instructions which when executed cause the method described herein to be performed by the data processing system 300 of FIG. 3 can be contained in a computer software product according to one embodiment of the invention. This computer software product can be loaded into and run by the data processing system 300 of FIG. 3. Moreover, the sequences of instructions which when executed cause the method described herein to be performed by the data processing system 300 of FIG. 3 can be contained in an integrated circuit product including a coprocessor or memory according to one embodiment of the invention. This integrated circuit product can be installed in the data processing system 300 of FIG. 3.

The embodiments of the invention described above are intended to be exemplary only. The scope of the invention is therefore intended to be limited solely by the scope of the appended claims.

What is claimed is:

1. A computer implemented method comprising:
    applying an appearance of a lens to an image to generate a presentation of a region-of-interest of an original image, the appearance of the lens having a bounds and a focal region with a magnification m for the region-of-interest at least partially surrounded by a shoulder region having diminishing magnification and a width sw, the focal region having a perimeter defined by a radius r from a line segment having a length len, the applying performed by:
    determining a maximum radius maxr for defining the perimeter of the focal region from a distance dl between a point near the bounds of the lens and a nearest point on the line segment, the magnification m, and the width sw of the shoulder region, wherein maxr=sw/(m−1)−dl; and
    restricting adjustment of the radius r to below the maximum radius maxr.

2. The computer implemented method of claim 1 and further comprising:
    determining a minimum shoulder width minw from the length len, radius r, and magnification m, wherein minw=(len+r)*(m−1); and,
    restricting adjustment of the width sw of the shoulder region to above the minimum shoulder width minw to thereby reduce occlusion of the shoulder region by the focal region.

3. The computer implemented method of claim 2 and further comprising:
    determining a maximum line segment length maxd from the radius r, magnification m, width sw of the shoulder region, and length len, wherein: maxd=sw/(m−1)−r, for m>1, and maxd=r+sw+len, for m≦1; and,
    restricting adjustment of the length len of the line segment to below the maximum line segment length maxd to thereby reduce occlusion of the shoulder region by the focal region.

4. The computer implemented method of claim 3 wherein the applying further comprises displacing the original image onto the appearance of the lens to produce a displacement and perspectively projecting the displacement onto a plane in a direction aligned with a viewpoint for the region-of-interest.

5. The computer implemented method of claim 4 and further comprising displaying the presentation on a display screen.

6. The computer implemented method of claim 3 and further comprising adjusting the radius r or the length len of the line segment and thereby adjusting the perimeter of the focal region in response to one or more signals.

7. The computer implemented method of claim 6 wherein the adjusting further comprises adjusting a position of an end of the line segment to rotate the focal region in response to one or more signals.

8. The computer implemented method of claim 7 and further comprising receiving the one or more signals through a graphical user interface ("GUI") displayed over the appearance of the lens.

9. The computer implemented method of claim 8 wherein the GUI is configured to adjust the radius r or the length len.

10. The computer implemented method of claim 9 wherein the GUI includes icons to perform the adjustment.

11. The computer implemented method of claim 10 wherein the length len is adjustable using a particular said icon positioned at an end of the line segment.

12. The computer implemented method of claim 10 wherein the distance dl is adjustable using a particular said icon positioned on a side of the perimeter.

13. The computer implemented method of claim 8 and further comprising receiving the one or more signals from a pointing device.

14. The computer implemented method of claim 13 wherein the pointing device is configured as a mouse, a pen, a tablet, a trackball, a keyboard, an eye tracking device, or a position tracking device.

15. The computer implemented method of claim 7 wherein the line segment and focal region are configured to rotate about a center point of the line segment.

16. The computer implemented method of claim 6 wherein an adjustment to a first end of the line segment causes a corresponding adjustment to a second end of the line segment.

17. The computer implemented method of claim 1 wherein the appearance of the lens is a surface.

18. The computer implemented method of claim 1 and further comprising adjusting the width sw of the shoulder region in response to one or more signals received through a GUI displayed over the appearance of the lens, wherein the GUI has one or more icons positioned on the bounds of the lens for adjusting the width sw.

19. A system for reducing occlusion in a presentation of a region-of-interest of an original image, the presentation generated by applying a lens to the original image, the lens having a bounds and a focal region with a magnification m for the region-of-interest at least partially surrounded by a shoulder region having diminishing magnification and a width sw, the focal region having a perimeter defined by a radius r from a line segment having a length len, the system comprising:
 a processor coupled to memory, a display screen, and an input device and adapted to perform operations comprising:
  determining a maximum radius maxr for defining the perimeter of the focal region from a distance dl between a point near the bounds of the lens and a nearest point on the line segment, the magnification m, and the width sw of the shoulder region, wherein maxr=sw/(m−1)−dl; and,
  restricting adjustment of the radius r to below the maximum radius maxr to thereby reduce occlusion of the shoulder region by the focal region.

20. A computer-implemented method comprising:
 applying an appearance of a lens to an image to generate a presentation of a region-of-interest of an original image, the appearance of the lens having a bounds and a focal region with a magnification m for the region-of-interest at least partially surrounded by a shoulder region having diminishing magnification and a width sw, the focal region having a perimeter defined by a radius r from a line segment having a length len, the applying performed by:
 determining a minimum shoulder width minw from the length len, radius r, and magnification m, wherein minw=(len+r)*(m−1); and
 restricting adjustment of the width sw of the shoulder region to above the minimum shoulder width minw.

21. The computer-implemented method of claim 20 wherein the applying further comprises displacing the original image onto the appearance of the lens to produce a displacement and perspectively projecting the displacement onto a plane in a direction aligned with a viewpoint for the region-of-interest.

22. The computer-implemented method of claim 20 and further comprising displaying the presentation on a display screen.

23. The computer-implemented method of claim 20 and wherein the applying further comprises adjusting the radius r or the length len of the line segment and thereby adjusting the perimeter of the focal region in response to one or more signals.

24. The computer-implemented method of claim 20 wherein the adjusting further comprises adjusting a position of an end of the line segment to rotate the focal region in response to one or more signals.

25. The computer-implemented method of claim 24 and further comprising receiving the one or more signals through a graphical user interface ("GUI") displayed over the appearance of the lens.

26. The computer-implemented method of claim 25 wherein the GUI is configured to adjust the radius r or the length len.

27. The computer-implemented method of claim 25 wherein the GUI includes icons to perform the adjustment.

28. The computer-implemented method of claim 20 wherein an adjustment to a first end of the line segment causes a corresponding adjustment to a second end of the line segment.

29. The computer-implemented method of claim 28 wherein the line segment and focal region are configured to rotate about a center point of the line segment.

30. A computer-implemented method comprising:
 applying an appearance of a lens to an image to generate a presentation of a region-of-interest of an original image, the appearance of the lens having a bounds and a focal region with a magnification m for the region-of-interest at least partially surrounded by a shoulder region having diminishing magnification and a width sw, the focal region having a perimeter defined by a radius r from a line segment having a length len, the applying performed by:
 determining a maximum line segment length maxd from the radius r, magnification m, width sw of the shoulder region, and length len, wherein: maxd=sw/(m−1)−r, for m>1, and maxd=r+sw+len, for m≦1; and, restricting adjustment of the length len of the line segment to below the maximum line segment length maxd.

31. The computer-implemented method of claim 30 wherein the applying further comprises displacing the original image onto the appearance of the lens to produce a displacement and perspectively projecting the displacement onto a plane in a direction aligned with a viewpoint for the region-of-interest.

32. The computer-implemented method of claim 30 and further comprising displaying the presentation on a display screen.

33. The computer-implemented method of claim 30 and wherein the applying further comprises adjusting the radius r or the length len of the line segment and thereby adjusting the perimeter of the focal region in response to one or more signals.

34. The computer-implemented method of claim 30 wherein the adjusting further comprises adjusting a position of an end of the line segment to rotate the focal region in response to one or more signals.

35. The computer-implemented method of claim 34 and further comprising receiving the one or more signals through a graphical user interface ("GUI") displayed over the appearance of the lens.

36. The computer-implemented method of claim 35 wherein the GUI is configured to adjust the radius r or the length len.

37. The computer-implemented method of claim 36 wherein the GUI includes icons to perform the adjustment.

38. The computer-implemented method of claim 30 wherein an adjustment to a first end of the line segment causes a corresponding adjustment to a second end of the line segment.

39. The computer-implemented method of claim 38 wherein the line segment and focal region are configured to rotate about a center point of the line segment.

40. A computer-implemented method comprising:
establishing an appearance of a lens for a region in an image, the appearance of the lens having a focal region with a magnification for the region at least partially surrounded by a shoulder region having diminishing magnification, the focal region having a perimeter defined by a radius from a line segment;
receiving one or more signals to adjust a position of an end of the line segment to thereby rotate the focal region;
adjusting a length of the line segment and thereby adjusting the perimeter of the focal region; and
applying the appearance of the lens having the adjusted perimeter to the image to produce a presentation,
wherein the line segment and focal region are configured to rotate about a center point of the line segment.

41. A method for magnifying image data, the method comprising:
magnifying a portion of the image data with a lens including:
an original focal region having a magnification and a perimeter, wherein the perimeter is defined by:
a line segment having two ends, and
a radius between the line segment and the perimeter;
a base defining an extent of the lens; and
a shoulder region surrounding the original focal region and bounded by the base, wherein the shoulder region has a non-uniform magnification that decreases from the original focal region to the base; and
moving at least one of the two ends of the line segment to generate an adjusted focal region;
wherein a size of an area of the adjusted focal region is different than a size of an area of the original focal region.

42. The method of claim 41, wherein said moving at least one of the two ends of the line segment further comprises changing a length of the line segment;
wherein a length of the adjusted focal region is different than a length of the original focal region.

43. The method of claim 42, further comprising coupling the two ends of the line segment;
wherein said changing a length of the line segment further comprises moving one end of the line segment in response to a movement of the other end of the line segment in an opposite direction.

44. The method of claim 41, wherein said moving at least one of the two ends of the line segment further comprises rotating the line segment;
wherein a rotational orientation of the adjusted focal region is different than a rotational orientation of the original focal region.

45. The method of claim 44, further comprising constraining the two ends of the line segment;
wherein said rotating the line segment further comprises rotating the line segment about a center point of the line segment in response to a movement of one of the two ends of the line segment.

46. The method of claim 41, further comprising changing the radius to adjust the adjusted focal region;
wherein a width of the adjusted focal region is different than a width of the original focal region.

47. The method of claim 41, further comprising generating a complex focal region by adjoining a plurality of line segments.

48. An apparatus for magnifying image data, the apparatus comprising:
one or more processors together with one or more memories configured to:
magnify a portion of the image data with a lens including:
an original focal region having a magnification and a perimeter, wherein the perimeter is defined by:
a line segment having two ends, and
a radius between the line segment and the perimeter;
a base defining an extent of the lens; and
a shoulder region surrounding the original focal region and bounded by the base, wherein the shoulder region has a non-uniform magnification that decreases from the original focal region to the base; and
move at least one of the two ends of the line segment to generate an adjusted focal region;
wherein a size of an area of the adjusted focal region is different than a size of an area of the original focal region.

49. The apparatus of claim 48, wherein the one or more processors together with the one or more memories are further configured to change a length of the line segment in response to a movement of at least one of the two ends;
wherein a length of the adjusted focal region is different than a length of the original focal region.

50. The apparatus of claim 49, wherein the one or more processors together with the one or more memories are further configured to move one end of the line segment in response to a movement of the other end of the line segment in an opposite direction.

51. The apparatus of claim 48, wherein the one or more processors together with the one or more memories are further configured to rotate the line segment;
wherein a rotational orientation of the adjusted focal region is different than a rotational orientation of the original focal region.

52. The apparatus of claim 51, wherein the one or more processors together with the one or more memories are further configured to rotate the line segment about a center point of the line segment in response to a movement of one of the two ends of the line segment.

53. The apparatus of claim 48, wherein the one or more processors together with the one or more memories are further configured to change the radius to adjust the adjusted focal region;
wherein a width of the adjusted focal region is different than a width of the original focal region.

54. The apparatus of claim 48, wherein the one or more processors together with the one or more memories are further configured to generate a complex focal region by adjoining a plurality of line segments.

55. A non-transitory computer-readable medium including a set of instructions comprising:
instructions for magnifying a portion of image data with a lens including:
an original focal region having a magnification and a perimeter, wherein the perimeter is defined by:
a line segment having two ends, and
a radius between the line segment and the perimeter;
a base defining an extent of the lens; and
a shoulder region surrounding the original focal region and bounded by the base, wherein the shoulder region has a non-uniform magnification that decreases from the original focal region to the base; and
instructions for moving at least one of the two ends of the line segment to generate an adjusted focal region;
wherein a size of an area of the adjusted focal region is different than a size of an area of the original focal region.

56. The computer-readable medium of claim 55, wherein the instructions for moving at least one of the two ends of the line segment further comprise instructions for changing a length of the line segment;
wherein a length of the adjusted focal region is different than a length of the original focal region.

57. The computer-readable medium of claim 56, further comprising instructions for coupling the two ends of the line segment;
wherein the instructions for changing a length of the line segment further comprise instructions for moving one end of the line segment in response to a movement of the other end of the line segment in an opposite direction.

58. The computer-readable medium of claim 55, wherein the instructions for moving at least one of the two ends of the line segment further comprise instructions for rotating the line segment;
wherein a rotational orientation of the adjusted focal region is different than a rotational orientation of the original focal region.

59. The computer-readable medium of claim 58, further comprising instructions for constraining the two ends of the line segment;
wherein the instructions for rotating the line segment further comprise instructions for rotating the line segment about a center point of the line segment in response to a movement of one of the two ends of the line segment.

60. The computer-readable medium of claim 55, further comprising instructions for changing the radius to adjust the adjusted focal region;
wherein a width of the adjusted focal region is different than a width of the original focal region.

61. The computer-readable medium of claim 55, further comprising instructions for generating a complex focal region by adjoining a plurality of line segments.

* * * * *

UNITED STATES PATENT AND TRADEMARK OFFICE
CERTIFICATE OF CORRECTION

PATENT NO. : 8,106,927 B2
APPLICATION NO. : 11/138979
DATED : January 31, 2012
INVENTOR(S) : Shoemaker et al.

It is certified that error appears in the above-identified patent and that said Letters Patent is hereby corrected as shown below:

Page 4, item (56), under "Other Publications", in Column 2, Line 29, delete "Annual ACM" and insert -- Annual --.

Page 5, item (56), under "Other Publications", in Column 1, Line 28, delete "software an technology," and insert -- software and technology, --.

Page 5, item (56), under "Other Publications", in Column 1, Line 34, delete "//paqes.cpsc.ucalqary.ca" and insert -- //pages.cpsc.ucalgary.ca --.

Page 5, item (56), under "Other Publications", in Column 2, Line 38, delete "software technology," and insert -- software and technology, --.

Column 1, line 4, below "Title" insert -- CROSS REFERENCE TO RELATED APPLICATION --.

Signed and Sealed this
Thirty-first Day of July, 2012

David J. Kappos
*Director of the United States Patent and Trademark Office*